(12) United States Patent
Hsieh et al.

(10) Patent No.: US 8,879,169 B2
(45) Date of Patent: Nov. 4, 2014

(54) IMAGE CAPTURING LENS SYSTEM

(75) Inventors: Dung-Yi Hsieh, Taichung (TW);
Tsung-Han Tsai, Taichung (TW);
Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 57 days.

(21) Appl. No.: 13/546,481

(22) Filed: Jul. 11, 2012

(65) Prior Publication Data
US 2013/0235476 A1    Sep. 12, 2013

(30) Foreign Application Priority Data
Mar. 9, 2012    (TW) .................................. 101108030

(51) Int. Cl.
*G02B 13/18* (2006.01)
*G02B 9/12* (2006.01)
*G02B 9/04* (2006.01)

(52) U.S. Cl.
USPC ........... 359/716; 359/717; 359/784; 359/785; 359/790; 359/795

(58) Field of Classification Search
USPC ..................... 359/716, 784, 785, 790, 795
See application file for complete search history.

(56) References Cited

U.S. PATENT DOCUMENTS

| 7,436,603 | B2 | 10/2008 | Huang et al. |
| 7,525,741 | B1 | 4/2009 | Noda |
| 2007/0064316 | A1* | 3/2007 | Noda .......................... 359/784 |
| 2009/0190236 | A1* | 7/2009 | Do .............................. 359/716 |

FOREIGN PATENT DOCUMENTS

| CN | 101918874 A | 12/2010 |
| JP | 3816095 B1 | 8/2006 |
| JP | 2007206611 A | 8/2007 |
| JP | 2009092803 A | 4/2009 |

* cited by examiner

*Primary Examiner* — Scott J Sugarman
*Assistant Examiner* — Mustak Choudhury
(74) *Attorney, Agent, or Firm* — Tim Tingkang Xia, Esq.; Morris, Manning & Martin, LLP

(57) ABSTRACT

This invention provides an image capturing lens system comprising three non-cemented lens elements with refractive power: a first lens element with positive refractive power having a convex object-side surface, and both the object-side and image-side surfaces being aspheric; a plastic second lens element with negative refractive power having a concave object-side surface and a convex image-side surface, and both the object-side and image-side surfaces being aspheric; and a plastic third lens element having a convex object-side surface and a concave image-side surface, and both the object-side and image-side surfaces being aspheric. By such arrangement, the space of the image capturing lens system can be allocated much more properly and thereby an image capturing lens system with shorter total track length can be obtained while retaining superior image quality.

23 Claims, 19 Drawing Sheets

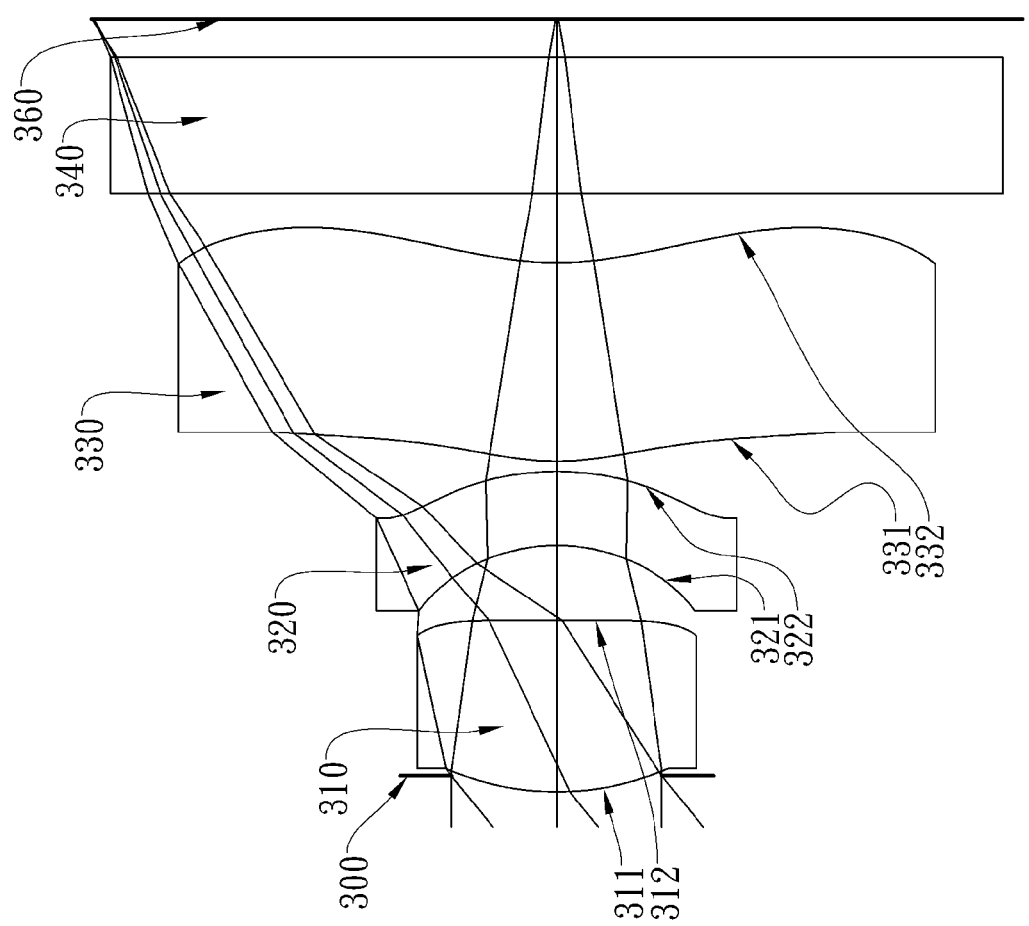

US 8,879,169 B2

IMAGE CAPTURING LENS SYSTEM

CROSS-REFERENCE TO RELATED APPLICATIONS

This non-provisional application claims priority under 35 U.S.C. §119(a) on Patent Application No. 101108030 filed in Taiwan R.O.C on Mar. 9, 2012, the entire contents of which are hereby incorporated by reference.

BACKGROUND OF THE INVENTION

1. Field of the Invention

The present invention relates to an image capturing lens system, and more particularly, to a compact image capturing lens system used in electronic products and three-dimensional (3D) image applications thereof.

2. Description of the Prior Art

The demand for compact imaging lens assembly has grown in recent years as the popularity of portable electronic products with photographing function has increased. The sensor of a general photographing camera is none other than CCD (Charge Coupled Device) or CMOS (Complementary Metal Oxide Semiconductor Sensor). Furthermore, as advanced semiconductor manufacturing technology has allowed the pixel size of sensors to be reduced, and the current electronic products are leaning toward a trend of being more compact, there is an increasing demand for compact imaging lens assembly featuring better image quality.

Most of the conventional compact lens assemblies adopt a two-lens element structure for cutting down the manufacture cost, such as the imaging lens system with two-lens element structure disclosed in U.S. Pat. No. 7,525,741. However, as the lens system only has two lens elements, the aberration correction ability of the system is limited, and the system fails to satisfy higher imaging demands. In order to acquire better image quality, adopting three lens elements for the lens system could be a favorable solution. U.S. Pat. No. 7,436,603 provides an imaging lens system with three-lens elements structure, which comprises, from the object-side to the image-side, a first lens element with positive refractive power, a second lens element with negative refractive power, and a third lens element with positive refractive power to form a Triplet formation. Although such lens system is able to correct most aberration occurred, the total track length is too long and therefore is not ideal.

In light of foregoing, it is noted that a balance between better image quality and proper total track length is always hard to be met. Therefore, there is a need in this field for a compact lens system with excellent image quality and proper total track length for portable electronic products.

SUMMARY OF THE INVENTION

The present invention provides an image capturing lens system, in order from an object side to an image side comprising three non-cemented lens elements with refractive power: a first lens element with positive refractive power having a convex object-side surface, and both the object-side and image-side surfaces being aspheric; a plastic second lens element with negative refractive power having a concave object-side surface and a convex image-side surface, and both the object-side and image-side surfaces being aspheric; and a plastic third lens element with refractive power having a convex object-side surface and a concave image-side surface, and both the object-side and image-side surfaces being aspheric; wherein the shape of the image-side surface of the third lens element changes from concave at the paraxial region thereof to convex while away from the paraxial region; wherein the image capturing lens system comprises a stop positioned between an imaged object and the image-side surface of the first lens element; wherein a total axial distance of the air intervals between the object-side surface of the first lens element and an image plane is $\Sigma AT$, an axial distance between the object-side surface of the first lens element and the image plane is TL, an axial distance between the stop and the image-side surface of the first lens element is SR2, a central thickness of the first lens element is CT1, and they satisfy the following relations: $0.10$ mm$<\Sigma AT<0.65$ mm; $0.10<\Sigma AT/TL<0.35$; and $0.65<SR2/CT1<1.50$.

Alternatively, the present invention provides an image capturing lens system, in order from an object side to an image side comprising three non-cemented lens elements with refractive power: a first lens element with positive refractive power having a convex object-side surface, and both the object-side and image-side surfaces being aspheric; a plastic second lens element with negative refractive power having a concave object-side surface and a convex image-side surface, and both the object-side and image-side surfaces being aspheric; and a plastic third lens element with refractive power having a convex object-side surface and a concave image-side surface, and both the object-side and image-side surfaces being aspheric; wherein the shape of the image-side surface of the third lens element changes from concave at the paraxial region thereof to convex while away from the paraxial region; wherein a total axial distance of the air intervals between the object-side surface of the first lens element and an image plane is $\Sigma AT$, a curvature radius of the object-side surface of the first lens element is R1, a curvature radius of the image-side surface of the first lens element is R2, an axial distance between the second lens element and the third lens element is T23, an axial distance between the first lens element and the second lens element is T12, and they satisfy the following relations: $0.10$ mm$<\Sigma AT<0.65$ mm; $-1.40<(R1+R2)/(R1-R2)<-0.75$; and $0<T23/T12<0.35$.

By such arrangement, the space of the image capturing lens system can be allocated much more properly and thereby an image capturing lens system with shorter total track length can be obtained while retaining superior image quality.

In the aforementioned image capturing lens system, the first lens element has positive refractive power and provides significant refractive power needed for the system, which is favorable for reducing the total track length thereof. When the second lens element has negative refractive power, the aberration produced by the first lens element with positive refractive power can be effectively corrected. When the third lens element has positive refractive power, it is able to properly distribute the refractive power of the first lens element for reducing sensitivity of the system. When the third lens element has negative refractive power, the principal point can be positioned away from an image plane, which is favorable for reducing the total track length of the system and keeping the system compact.

In the aforementioned image capturing lens system, the first lens element can be a bi-convex lens element or a meniscus lens element having a convex object-side surface and a concave image-side surface. When the first lens element is a bi-convex lens element, the refractive power of the first lens element can be strengthened for reducing the total track length of the system. When the first lens element is a convex-concave meniscus lens element, it is favorable for correcting the astigmatism of the system. When the second lens element has a concave object-side surface and a convex image-side surface, the astigmatism of the system can be favorably corrected. When the third lens element has a convex object-side surface and a concave image-side surface, it is favorable for correcting both the astigmatism and high order aberration of the system. When the shape of the image-side surface of the third lens element changes from concave at the paraxial region thereof to convex while away from the paraxial region, the distortion and high order aberration raised from peripheral light in the system can be corrected for improving image resolution.

BRIEF DESCRIPTION OF THE DRAWINGS

FIG. 3A shows an image capturing lens system in accordance with a third embodiment of the present invention.

DETAILED DESCRIPTION OF THE PREFERRED EMBODIMENTS

Figure 1A:
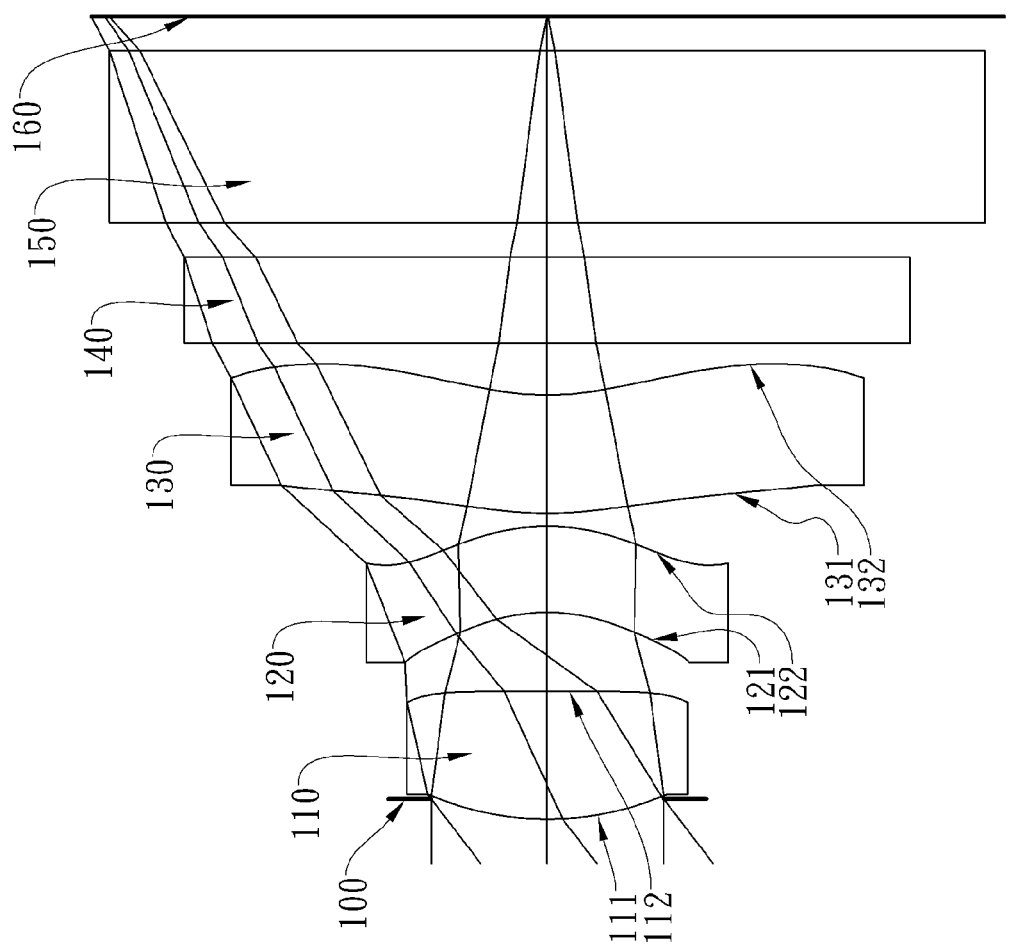
FIG. 1A shows an image capturing lens system in accordance with a first embodiment of the present invention.

The present invention provides an image capturing lens system, in order from an object side to an image side comprising three non-cemented lens elements with refractive power: a first lens element with positive refractive power having a convex object-side surface, and both the object-side and image-side surfaces being aspheric; a plastic second lens element with negative refractive power having a concave object-side surface and a convex image-side surface, and both the object-side and image-side surfaces being aspheric; and a plastic third lens element with refractive power having a convex object-side surface and a concave image-side surface, and both the object-side and image-side surfaces being aspheric; wherein the shape of the image-side surface of the third lens element changes from concave at the paraxial region thereof to convex while away from the paraxial region; wherein the image capturing lens system comprises a stop positioned between an imaged object and the image-side surface of the first lens element; wherein a total axial distance of the air intervals between the object-side surface of the first lens element and an image plane is $\Sigma AT$, an axial distance between the object-side surface of the first lens element and the image plane is TL, an axial distance between the stop and the image-side surface of the first lens element is SR2, a central thickness of the first lens element is CT1, and they satisfy the following relations: 0.10 mm<$\Sigma AT$<0.65 mm; 0.10<$\Sigma AT/TL$<0.35; and 0.65<SR2/CT1<1.50.

When the relation of 0.10 mm<$\Sigma AT$<0.65 mm is satisfied, the space usage of the system is more efficient, which is favorable for reducing the total track length of the system; preferably, the following relation is satisfied: 0.10 mm<$\Sigma AT$<0.55 mm.

When the relation of 0.10<$\Sigma AT/TL$<0.35 is satisfied, the positioning of each lens element is much more precise and compact, which is favorable for reducing the total track length of the system.

When the relation of 0.65<SR2/CT1<1.50 is satisfied, the position of the stop and the thickness of the first lens element are more suitable for reducing the total track length of the system while maintaining superior image quality.

In the aforementioned image capturing lens system, an axial distance between the second lens element and the third lens element is T23, an axial distance between the first lens element and the second lens element is T12, and they preferably satisfy the following relation: 0<T23/T12<0.35. When the above relation is satisfied, the interval between each lens element is more ideal for reducing the total track length of the system.

In the aforementioned image capturing lens system, a total axial distance of the air intervals between the image-side surface of the third lens element and the image plane is BAT, a focal length of the image capturing lens system is f, and they preferably satisfy the following relation: 0.1<BAT/f<0.24. When the above relation is satisfied, a sufficient space can be provided for the system to allocate other required optical elements without resulting in excessive increment of the total track length to the system.

In the aforementioned image capturing lens system, the axial distance between the first lens element and the second lens element is T12, the axial distance between the second lens element and the third lens element is T23, a total central thickness of all lens elements in the image capturing lens system is $\Sigma CT$, and they preferably satisfy the following relation: 0.1<(T12+T23)/$\Sigma CT$<0.35. When the above relation is satisfied, the position and thickness of each lens element are more proper, which can make the space usage of the system more efficient.

In the aforementioned image capturing lens system, the focal length of the image capturing lens system is f, a focal length of the third lens element is f3, and they preferably satisfy the following relation: −0.2<f/f3<0. When the above relation is satisfied, the refractive power required for the system can be effectively distributed for controlling the total track length thereof.

In the aforementioned image capturing lens system, the focal length of the image capturing lens system is f, and it preferably satisfies the following relation: 1.20 mm≤f≤2.20 mm. When the above relation is satisfied, the total track length of the system is more proper for keeping the system compact.

In the aforementioned image capturing lens system, a curvature radius of the object-side surface of the first lens element is R1, the focal length of the image capturing lens system is f, and they preferably satisfy the following relation: 0.35<R1/f<0.55. When the above relation is satisfied, it ensures that the first lens element provides sufficient refractive power to the system, and it can prevent the spherical aberration from being excessively large.

In the aforementioned image capturing lens system, an Abbe number of the first lens element is V1, an Abbe number of the second lens element is V2, and they preferably satisfy the following relation: 2.0<V1/V2<3.5. When the above relation is satisfied, the chromatic aberration can be effectively corrected.

In the aforementioned image capturing lens system, a central thickness of the second lens element is CT2, and it preferably satisfies the following relation: 0.15 mm<CT2<0.24 mm. When the above relation is satisfied, the thickness of the second lens element is more proper for reducing the total track length of the system.

In the aforementioned image capturing lens system, when the system further comprises at least two flat elements positioned between the image-side surface of the third lens element and the image plane, it is favorable for improving the performance of the system and thereby making the image capturing lens system of the present invention suitable for various applications.

Alternatively, the present invention provides an image capturing lens system, in order from an object side to an image side comprising three non-cemented lens elements with refractive power: a first lens element with positive refractive power having a convex object-side surface, and both the object-side and image-side surfaces being aspheric; a plastic second lens element with negative refractive power having a concave object-side surface and a convex image-side surface, and both the object-side and image-side surfaces being aspheric; and a plastic third lens element with refractive power having a convex object-side surface and a concave image-side surface, and both the object-side and image-side surfaces being aspheric; wherein the shape of the image-side surface of the third lens element changes from concave at the paraxial region thereof to convex while away from the paraxial region; wherein a total axial distance of the air intervals between the object-side surface of the first lens element and an image plane is $\Sigma AT$, a curvature radius of the object-side surface of the first lens element is R1, a curvature radius of the image-side surface of the first lens element is R2, an axial distance between the second lens element and the third lens element is T23, an axial distance between the first lens element and the second lens element is T12, and they satisfy the following relations: 0.10 mm<$\Sigma AT$<0.65 mm; −1.40<(R1+R2)/(R1−R2)<−0.75; and 0<T23/T12<0.35.

When the relation of 0.10 mm<$\Sigma AT$<0.65 mm is satisfied, the space usage of the system is more efficient, which is favorable for reducing the total track length of the system; preferably, the following relation is satisfied: 0.10 mm<$\Sigma AT$<0.55 mm.

When the relation of −1.40<(R1+R2)/(R1−R2)<−0.75 is satisfied, the spherical aberration of the system can be favorably corrected.

When the relation of 0<T23/T12<0.35 is satisfied, the interval between each lens element is more ideal for reducing the total track length of the system.

In the aforementioned image capturing lens system, a total axial distance of the air intervals between the image-side surface of the third lens element and the image plane is BAT, a focal length of the image capturing lens system is f, and they preferably satisfy the following relation: 0.1<BAT/f<0.24. When the above relation is satisfied, a sufficient space can be provided for the system to allocate other required optical elements without resulting in excessive increment of the total track length to the system.

In the aforementioned image capturing lens system, the focal length of the image capturing lens system is f, a focal length of the third lens element is f3, and they preferably satisfy the following relation: −0.2<f/f3<0. When the above relation is satisfied, the refractive power required for the system can be effectively distributed for controlling the total track length thereof.

In the aforementioned image capturing lens system, an Abbe number of the first lens element is V1, an Abbe number of the second lens element is V2, and they preferably satisfy the following relation: 2.0<V1/V2<3.5. When the above relation is satisfied, the chromatic aberration can be effectively corrected.

In the aforementioned image capturing lens system, the focal length of the image capturing lens system is f, and it preferably satisfies the following relation: 1.20 mm≤f≤2.20 mm. When the above relation is satisfied, the total track length of the system is more proper for keeping the system compact.

In the aforementioned image capturing lens system, the system further comprises a stop, an axial distance between the stop and the image-side surface of the first lens element is SR2, a central thickness of the first lens element is CT1, and they preferably satisfy the following relation: 0.65<SR2/CT1<1.50. When the above relation is satisfied, the position of the stop and the thickness of the first lens element are more suitable for reducing the total track length of the system while maintaining superior image quality.

In the aforementioned image capturing lens system, the axial distance between the first lens element and the second lens element is T12, the axial distance between the second lens element and the third lens element is T23, a total central thickness of all lens elements in the image capturing lens system is $\Sigma CT$, and they preferably satisfy the following relation: 0.1<(T12+T23)/$\Sigma CT$<0.35. When the above relation is satisfied, the position and thickness of each lens element are more proper, which can make the space usage of the system more efficient.

In the aforementioned image capturing lens system, a central thickness of the second lens element is CT2, and it preferably satisfies the following relation: 0.15 mm<CT2<0.24 mm. When the above relation is satisfied, the thickness of the second lens element is more proper for reducing the total track length of the system.

In the aforementioned image capturing lens system, when the system further comprises at least two flat elements positioned between the image-side surface of the third lens element and the image plane, it is favorable for improving the performance of the system and thereby making the image capturing lens system of the present invention suitable for various applications.

In the aforementioned image capturing lens system, the lens elements can be made of glass or plastic material. If the lens elements are made of glass, the freedom for distributing the refractive power of the image capturing lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the required number of the lens elements used in an optical system. Consequently, the total track length of the image capturing lens system can be effectively reduced.

The present image capturing lens system may comprise at least one stop. Said stop includes but not limits to an aperture stop, a glare stop, or a field stop. Said glare stop or said field stop can be configured for reducing stray light resulting in improved image quality.

In the present image capturing lens system, an aperture stop can be configured as a front stop or a middle stop. A front stop can provide a longer distance between an exit pupil of the system and an image plane which can improve the image-sensing efficiency of an image sensor, such as CCD or CMOS. On the other hand, a middle stop is favorable for enlarging the field of view of the system as well as providing features associated with a wider field of view.

In the present image capturing lens system, if a lens element has a convex surface, it means the portion of the surface in proximity to the optical axis is convex; if a lens element has a concave surface, it means the portion of the surface in proximity to the optical axis is concave.

Figure 10:
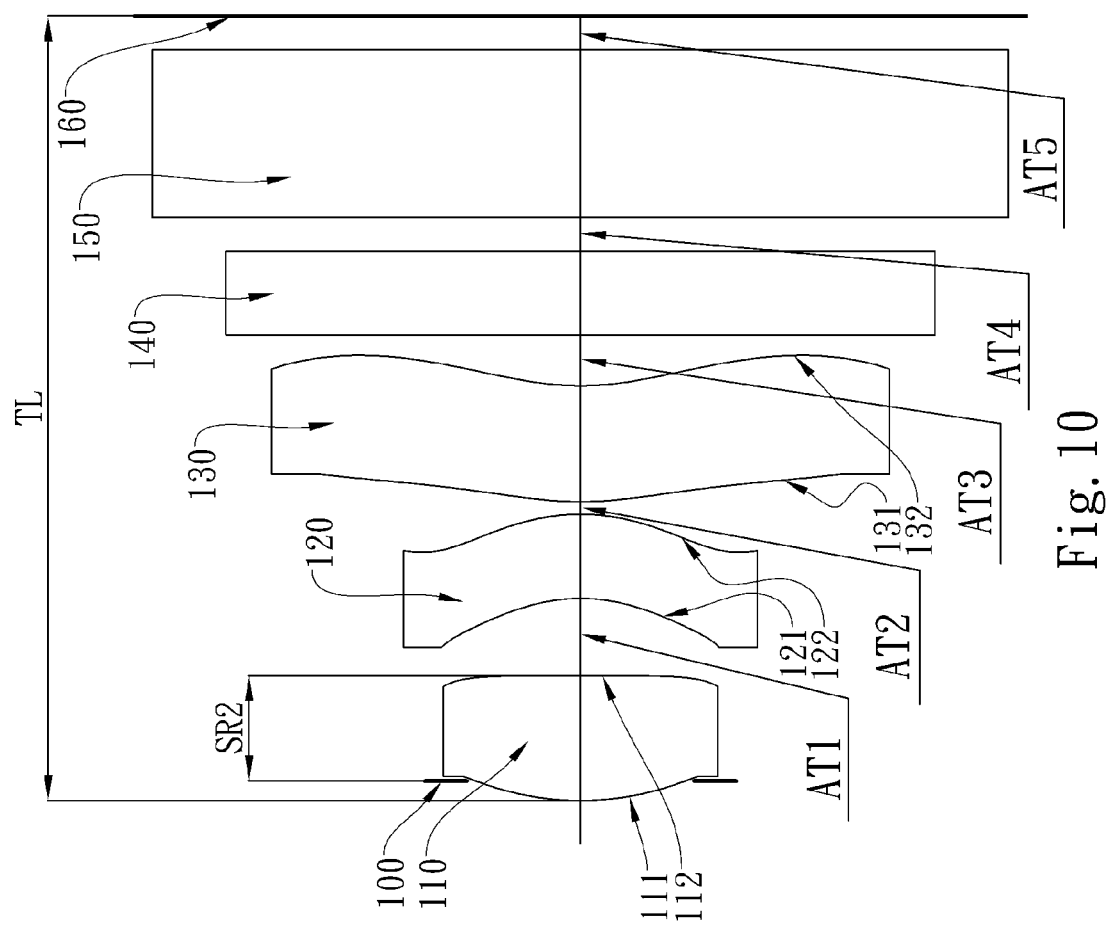
FIG. 10 shows the distance represented by the relation of AT, SR2 and TL in the present invention.

Please refer to FIG. 10, showing the first embodiment of the present invention, the first embodiment is described to clarify the distance represented by the relations of AT, SR2 and TL in the present invention. An axial distance of the air space between two adjacent lens elements in the present image capturing lens system is AT. As shown in this figure, an axial distance of the air space between the image-side surface 112 of the first lens element 110 and the object-side surface 121 of the second lens element 120 is AT1, an axial distance of the air space between the image-side surface 122 of the second lens element 120 and the object-side surface 131 of the third lens element 130 is AT2, an axial distance of the air space between the image-side surface 132 of the third lens element 130 and the IR filter 140 is AT3, an axial distance of the air space between the IR filter 140 and the cover glass 150 is AT4, an axial distance of the air space between the cover glass 150 and the image plane 160 is AT5.

Furthermore, a total axial distance of the air intervals between the object-side surface 111 of the first lens element 110 and the image plane 160 is ΣAT; therefore, in the embodiment shown in this figure, ΣAT is equal to the sum of AT1, AT2, AT3, AT4 and AT5. In addition, a total axial distance of the air intervals between the image-side surface 132 of the third lens element 130 and the image plane 160 is BAT; therefore, in the embodiment shown in this figure, BAT is equal to the total amount of AT3, AT4 and AT5.

Referring to FIG. 10, an axial distance between the stop 100 and the image-side surface 112 of the first lens element 110 is SR2. When the stop 100 is positioned at the object-side of the image-side surface 112 of the first lens element 110, SR2 is defined as positive; when the stop 100 is positioned at the image-side of the image-side surface 112 of the first lens element 110, SR2 is defined as negative. As shown in FIG. 10, the stop 100 is positioned at the object-side of the image-side surface 112 of the first lens element 110; therefore, SR2 in this embodiment shown in this figure is positive.

Referring to FIG. 10, an axial distance between the object-side surface 111 of the first lens element 110 and the image plane 160 is TL. As shown in the figure, TL includes, from the object-side surface 111 of the first lens element 110 to the image plane 160, the sum of the central thickness of each lens element and the axial distance of the air intervals between adjacent elements.

Preferred embodiments of the present invention will be described in the following paragraphs by referring to the accompanying drawings.

Embodiment 1

Figure 1B:
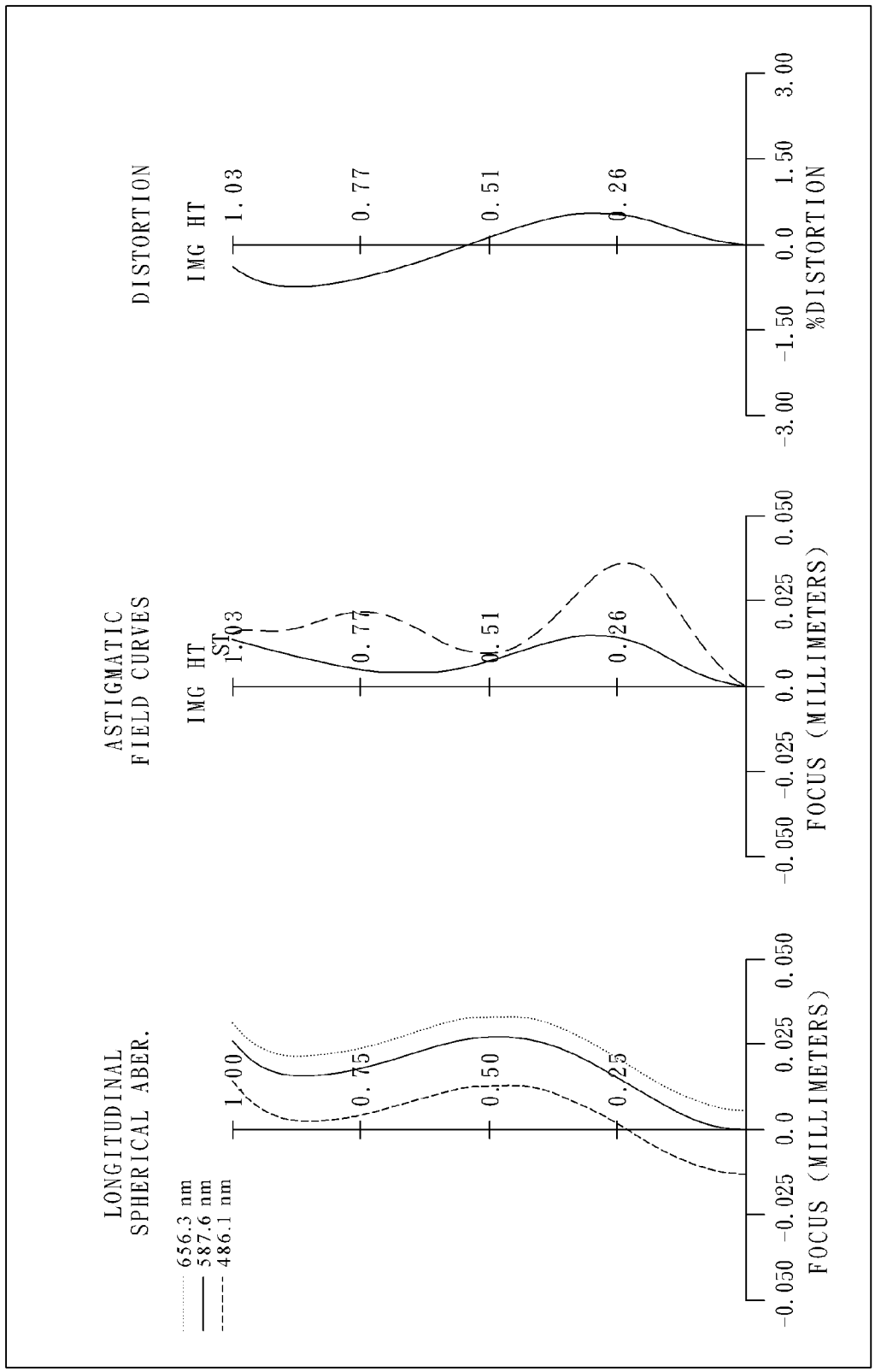
FIG. 1B shows the aberration curves of the first embodiment of the present invention.

FIG. 1A shows an image capturing lens system in accordance with the first embodiment of the present invention, and FIG. 1B shows the aberration curves of the first embodiment of the present invention. The image capturing lens system of the first embodiment of the present invention mainly comprises three non-cemented lens elements, in order from an object side to an image side:

a plastic first lens element 110 with positive refractive power having a convex object-side surface 111 and a concave image-side surface 112, the object-side and image-side surfaces 111 and 112 thereof being aspheric;

a plastic second lens element 120 with negative refractive power having a concave object-side surface 121 and a convex image-side surface 122, the object-side and image-side surfaces 121 and 122 thereof being aspheric; and a plastic third lens element 130 with negative refractive power having a convex object-side surface 131 and a concave image-side surface 132, the object-side and image-side surfaces 131 and 132 thereof being aspheric; wherein the shape of the image-side surface 132 of the third lens element 130 changes from concave at the paraxial region thereof to convex while away from the paraxial region;

wherein a stop, can be an aperture stop 100 is disposed between an imaged object and the first lens element 110;

the image capturing lens system further comprises a IR cut-filter 140 disposed between the image-side surface 132 of the third lens element 130 and a cover glass 150; the IR cut-filter 140 is made of glass and has no influence on the focal length of the image capturing lens system; the image capturing lens system further comprises an image sensor provided on an image plane 160.

The detailed optical data of the first embodiment is shown in TABLE 1, and the aspheric surface data is shown in TABLE 2, wherein the units of the curvature radius, the thickness and the focal length are expressed in mm, and HFOV is half of the maximal field of view.

TABLE 1

(Embodiment 1)
f = 1.33 mm, Fno = 2.46, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.047 | | | | |
| 2 | Lens 1 | 0.669 (ASP) | 0.297 | Plastic | 1.544 | 55.9 | 1.24 |
| 3 | | 100.000 (ASP) | 0.184 | | | | |
| 4 | Lens 2 | −0.419 (ASP) | 0.200 | Plastic | 1.640 | 23.3 | −42.10 |
| 5 | | −0.504 (ASP) | 0.030 | | | | |
| 6 | Lens 3 | 0.754 (ASP) | 0.276 | Plastic | 1.544 | 55.9 | −43.44 |
| 7 | | 0.637 (ASP) | 0.120 | | | | |
| 8 | IR-filter | Plano | 0.200 | Glass | 1.517 | 64.2 | — |
| 9 | | Plano | 0.080 | | | | |

TABLE 1-continued (Embodiment 1)
f = 1.33 mm, Fno = 2.46, HFOV = 37.5 deg.

| Surface # | | Curvature Radius | Thickness | Material | Index | Abbe # | Focal length |
|---|---|---|---|---|---|---|---|
| 10 | Cover-glass | Plano | 0.400 | Glass | 1.517 | 64.2 | — |
| 11 | | Plano | 0.080 | | | | |
| 12 | Image | Plano | — | | | | |

*Reference wavelength is d-line 587.6 nm

TABLE 2

Aspheric Coefficients

| | Surface # | | | | | |
|---|---|---|---|---|---|---|
| | 2 | 3 | 4 | 5 | 6 | 7 |
| k = | −1.0677E+00 | −9.0000E+01 | −8.5151E−01 | −2.1001E−02 | −2.2803E+01 | −7.4066E+00 |
| A4 = | −7.8497E−02 | −4.5960E−01 | 2.0020E+00 | 3.9069E−02 | −1.0569E+00 | −1.3781E+00 |
| A6 = | 1.4640E+01 | −3.0859E+01 | −5.0475E+00 | 3.1792E+01 | 4.2406E+00 | 3.8226E+00 |
| A8 = | −3.7884E+02 | 6.8245E+02 | 8.9933E+01 | −4.8108E+01 | −7.9677E+00 | −8.0564E+00 |
| A10 = | 4.4089E+03 | −7.8222E+03 | 1.8850E+03 | 5.5281E+02 | 6.9385E+00 | 8.2473E+00 |
| A12 = | −2.3534E+04 | 2.4599E+04 | −2.5216E+04 | −4.6039E+03 | −2.1850E+00 | 2.0638E+00 |
| A14 = | | | | 9.7417E+03 | 2.2811E+00 | −1.3012E+01 |
| A16 = | | | | | −3.0719E+00 | 8.4984E+00 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the distance of a point on the aspheric surface at a distance Y from the optical axis relative to the tangential plane at the aspheric surface vertex;

Y: the distance from the point on the curve of the aspheric surface to the optical axis;

R: curvature radius;

k: the conic coefficient;

Ai: the aspheric coefficient of order i.

In the first embodiment of the present image capturing lens system, the focal length of the image capturing lens system is f, and it satisfies the following relation: f=1.33 (mm).

In the first embodiment of the present image capturing lens system, the f-number of the image capturing lens system is Fno, and it satisfies the relation: Fno=2.46.

In the first embodiment of the present image capturing lens system, half of the maximal field of view of the image capturing lens system is HFOV, and it satisfies the relation: HFOV=37.5 deg.

In the first embodiment of the present image capturing lens system, the Abbe number of the first lens element 110 is V1, the Abbe number of the second lens element 120 is V2, and they satisfy the following relation: V1/V2=2.40.

In the first embodiment of the present image capturing lens system, the total axial distance of the air intervals between the object-side surface 111 of the first lens element 110 and the image plane 160 is ΣAT, and it satisfies the relation: ΣAT=0.49 (mm).

In the first embodiment of the present image capturing lens system, the total axial distance of the air intervals between the object-side surface 111 of the first lens element 110 and the image plane 160 is ΣAT, an axial distance between the object-side surface 111 of the first lens element 110 and the image plane 160 is TL, and they satisfy the following relation: ΣAT/TL=0.27.

In the first embodiment of the present image capturing lens system, the total axial air intervals between the image-side surface 132 of the third lens element 130 and the image plane 160 is BAT, the focal length of the image capturing lens system is f, and they satisfy the following relation: BAT/f=0.21.

In the first embodiment of the present image capturing lens system, the axial distance between the first lens element 110 and the second lens element 120 is T12, the axial distance between the second lens element 120 and the third lens element 130 is T23, a total central thickness of all lens elements in the image capturing lens system is ΣCT, and they satisfy the following relation: (T12+T23)/ΣCT=0.28.

In the first embodiment of the present image capturing lens system, a central thickness of the second lens element 120 is CT2, and it satisfies the relation: CT2=0.20 (mm).

In the first embodiment of the present image capturing lens system, the axial distance between the second lens element 120 and the third lens element 130 is T23, the axial distance between the first lens element 110 and the second lens element 120 is T12, and they satisfy the following relation: T23/T12=0.16.

In the first embodiment of the present image capturing lens system, the axial distance between the stop 100 and the image-side surface 112 of the first lens element 110 is SR2, the central thickness of the first lens element 110 is CT1, and they satisfy the following relation: SR2/CT1=0.84.

In the first embodiment of the present image capturing lens system, the curvature radius of the object-side surface 111 of the first lens element 110 is R1, the curvature radius of the image-side surface 112 of the first lens element 110 is R2, and they satisfy the following relation: (R1+R2)/(R1−R2)=−1.01.

In the first embodiment of the present image capturing lens system, the curvature radius of the object-side surface 111 of the first lens element 110 is R1, the focal length of the image capturing lens system is f, and they satisfy the following relation: R1/f=0.50.

In the first embodiment of the present image capturing lens system, the focal length of the image capturing lens system is f, the focal length of the third lens element 130 is f3, and they satisfy the following relation: f/f3=−0.03.

Embodiment 2

Figure 2A:
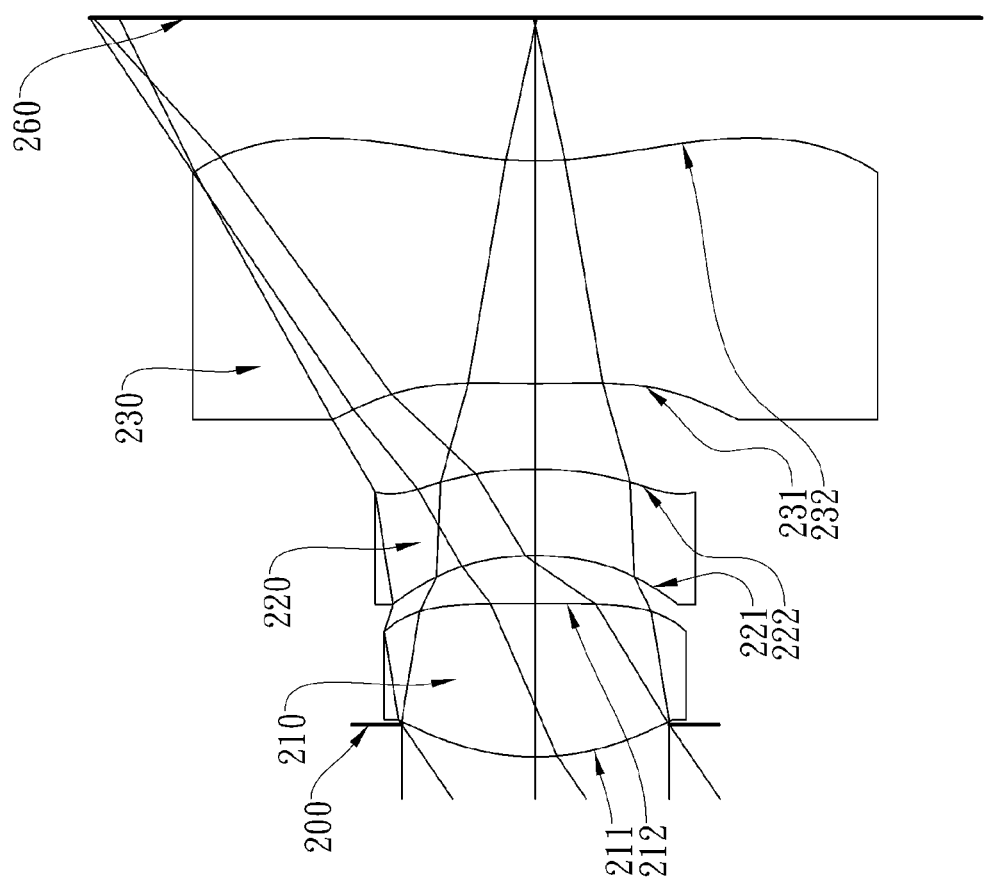
FIG. 2A shows an image capturing lens system in accordance with a second embodiment of the present invention.
Figure 2B:
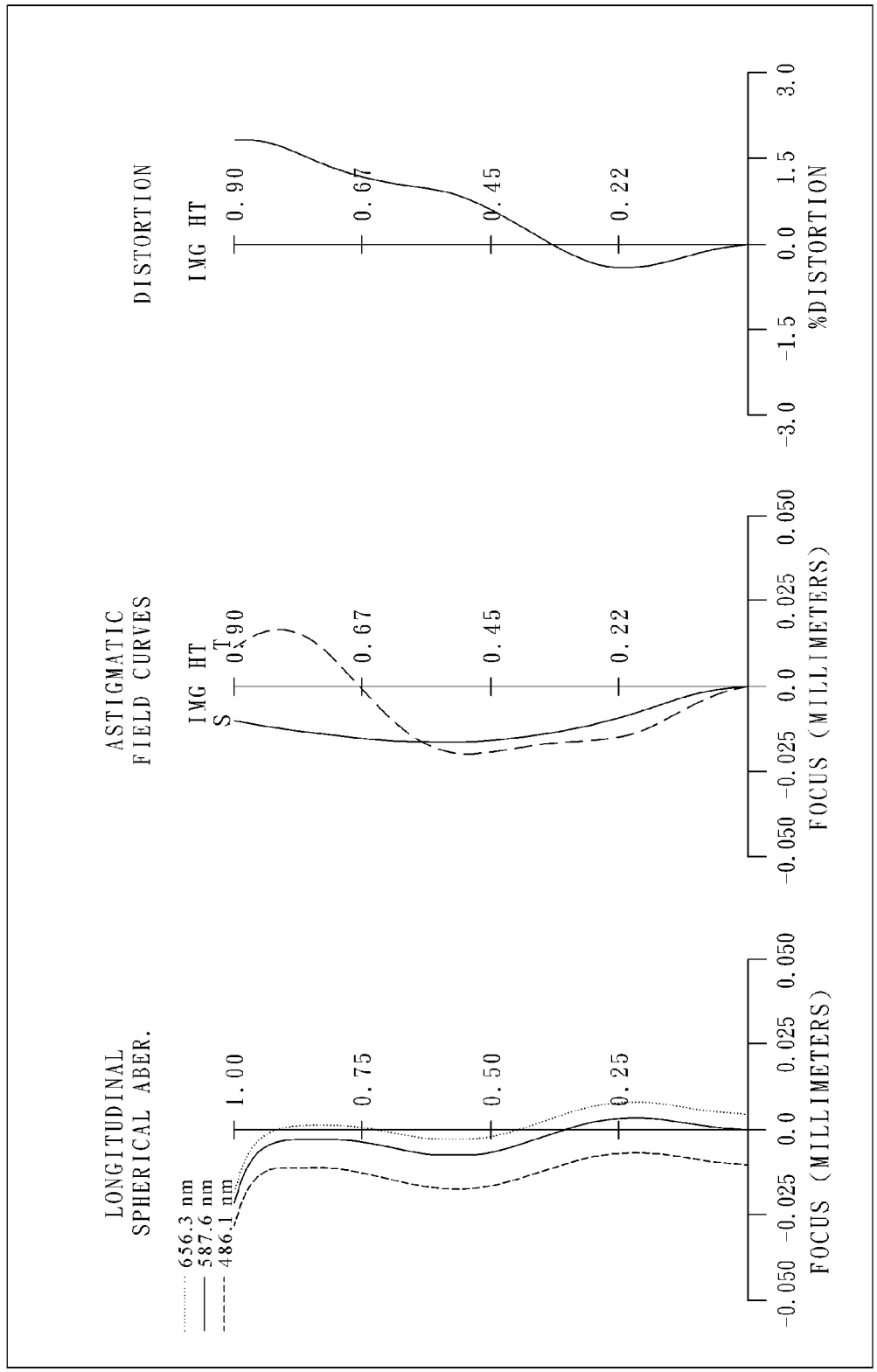
FIG. 2B shows the aberration curves of the second embodiment of the present invention.

FIG. 2A shows an image capturing lens system in accordance with the second embodiment of the present invention, and FIG. 2B shows the aberration curves of the second embodiment of the present invention. The image capturing lens system of the second embodiment of the present invention mainly comprises three non-cemented lens elements, in order from an object side to an image side:

a plastic first lens element 210 with positive refractive power having a convex object-side surface 211 and a concave image-side surface 212, the object-side and image-side surfaces 211 and 212 thereof being aspheric;

a plastic second lens element 220 with negative refractive power having a concave object-side surface 221 and a convex image-side surface 222, the object-side and image-side surfaces 221 and 222 thereof being aspheric; and a plastic third lens element 230 with negative refractive power having a convex object-side surface 231 and a concave image-side surface 232, the object-side and image-side surfaces 231 and 232 thereof being aspheric; wherein the shape of the image-side surface 232 of the third lens element 230 changes from concave at the paraxial region thereof to convex while away from the paraxial region;

wherein an aperture stop 200 is disposed between an imaged object and the first lens element 210; the image capturing lens system further comprises an image sensor provided on an image plane 260.

The detailed optical data of the second embodiment is shown in TABLE 3, and the aspheric surface data is shown in TABLE 4, wherein the units of the curvature radius, the thickness and the focal length are expressed in mm, and HFOV is half of the maximal field of view.

TABLE 3

(Embodiment 2)
f = 1.30 mm, Fno = 2.40, HFOV = 34.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.065 | | | | |
| 2 | Lens 1 | 0.510 (ASP) | 0.309 | Plastic | 1.544 | 55.9 | 0.94 |
| 3 | | 100.000 (ASP) | 0.097 | | | | |
| 4 | Lens 2 | −0.600 (ASP) | 0.175 | Plastic | 1.640 | 23.3 | −5.78 |
| 5 | | −0.797 (ASP) | 0.173 | | | | |
| 6 | Lens 3 | 3.286 (ASP) | 0.450 | Plastic | 1.544 | 55.9 | −1.92 |
| 7 | | 0.753 (ASP) | 0.289 | | | | |
| 8 | Image | Plano | — | | | | |

*Reference wavelength is d-line 587.6 nm

TABLE 4

Aspheric Coefficients

| | Surface # | | | | | |
|---|---|---|---|---|---|---|
| | 2 | 3 | 4 | 5 | 6 | 7 |
| k = | −1.2192E+01 | 0.0000E+00 | 7.8770E−01 | −9.2902E−01 | −2.3039E+02 | −1.6525E+01 |
| A4 = | 1.0028E+01 | −3.7939E+00 | −3.9742E+00 | −4.1868E+00 | −5.7926E+00 | −6.8431E−01 |
| A6 = | −1.3396E+02 | −3.3705E+01 | −1.0957E+02 | 3.7709E+01 | 1.7459E+01 | −4.2214E−01 |
| A8 = | 1.2763E+03 | 1.9077E+02 | 3.1813E+03 | −3.2066E+01 | −1.3832E+01 | 1.7995E+00 |
| A10 = | −6.1282E+03 | −1.6194E+03 | −2.4944E+04 | 4.7882E+03 | 1.2199E+01 | −1.8322E+00 |
| A12 = | −4.1038E+03 | | 5.1002E+04 | −2.5624E+04 | 2.1569E+01 | −2.8521E−01 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

| Embodiment 2 | |
|---|---|
| f [mm] | 1.30 |
| Fno | 2.40 |
| HFOV [deg.] | 34.4 |
| V1/V2 | 2.40 |
| ΣAT [mm] | 0.56 |
| ΣAT/TL | 0.37 |
| BAT/f | 0.22 |
| (T12 + T23)/ΣCT | 0.29 |
| CT2[mm] | 0.18 |
| T23/T12 | 1.78 |
| SR2/CT1 | 0.79 |
| (R1 + R2)/(R1 − R2) | −1.01 |
| R1/f | 0.39 |
| f/f3 | −0.68 |

Embodiment 3

Figure 3B:
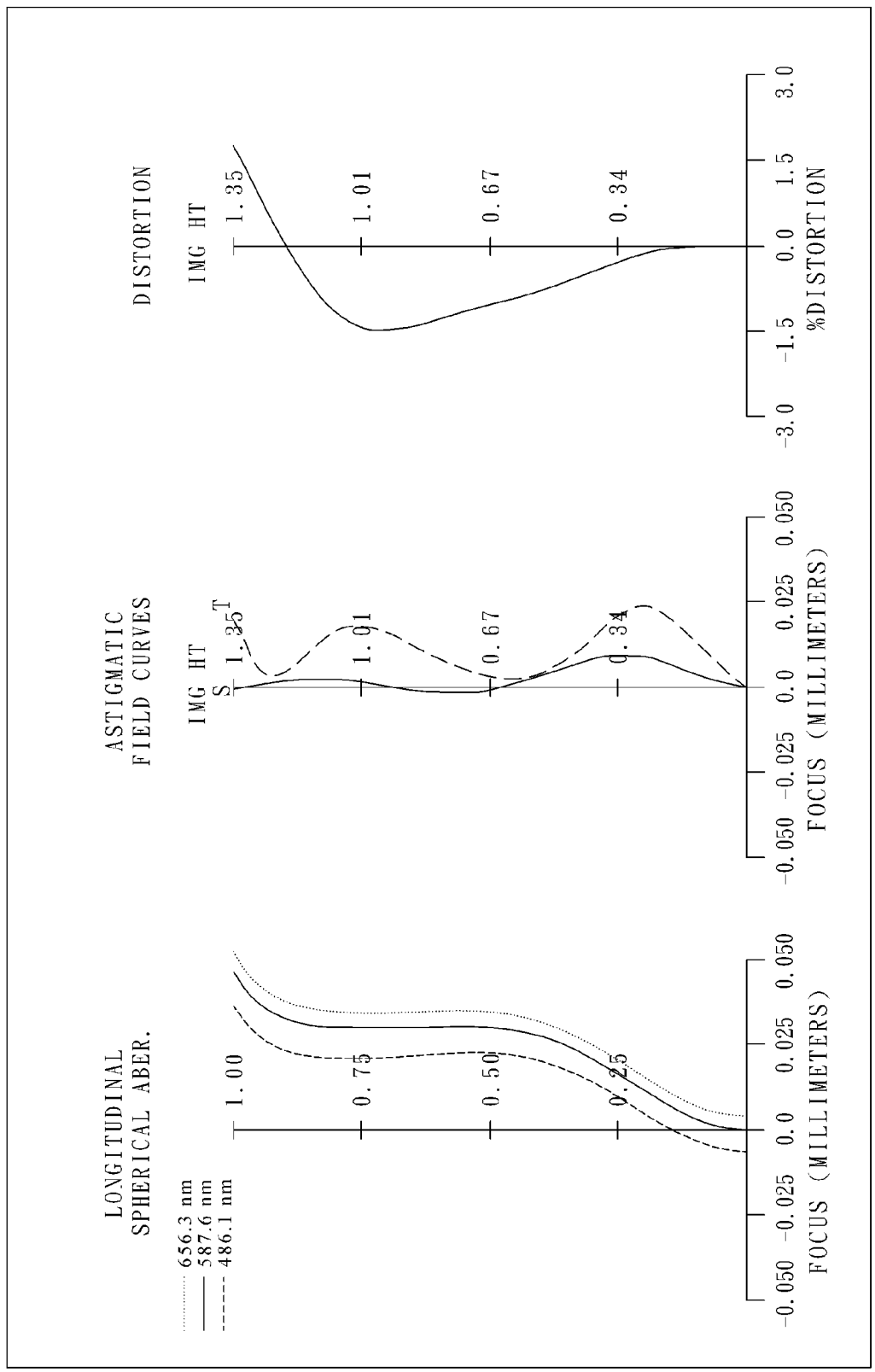
FIG. 3B shows the aberration curves of the third embodiment of the present invention.

FIG. 3A shows an image capturing lens system in accordance with the third embodiment of the present invention, and FIG. 3B shows the aberration curves of the third embodiment of the present invention. The image capturing lens system of the third embodiment of the present invention mainly comprises three non-cemented lens elements, in order from an object side to an image side:

a plastic first lens element 310 with positive refractive power having a convex object-side surface 311 and a concave image-side surface 312, the object-side and image-side surfaces 311 and 312 thereof being aspheric;

a plastic second lens element 320 with negative refractive power having a concave object-side surface 321 and a convex image-side surface 322, the object-side and image-side surfaces 321 and 322 thereof being aspheric; and a plastic third lens element 330 with positive refractive power having a convex object-side surface 331 and a concave image-side surface 332, the object-side and image-side surfaces 331 and 332 thereof being aspheric; wherein the shape of the image-side surface 332 of the third lens element 330 changes from concave at the paraxial region thereof to convex while away from the paraxial region;

wherein an aperture stop 300 is disposed between an imaged object and the first lens element 310;

the image capturing lens system further comprises a IR cut-filter 340 disposed between the image-side surface 332 of the third lens element 330 and an image plane 360; the IR cut-filter 340 is made of glass and has no influence on the focal length of the image capturing lens system. The image capturing lens system further comprises an image sensor provided on an image plane 360.

The detailed optical data of the third embodiment is shown in TABLE 6, and the aspheric surface data is shown in TABLE 7, wherein the units of the curvature radius, the thickness and the focal length are expressed in mm, and HFOV is half of the maximal field of view.

the relations of the third embodiment are listed in the following TABLE 8.

TABLE 8

| Embodiment 3 | |
|---|---|
| f [mm] | 1.63 |
| Fno | 2.65 |
| HFOV [deg.] | 38.9 |
| V1/V2 | 2.61 |
| ΣAT [mm] | 0.56 |
| ΣAT/TL | 0.25 |
| BAT/f | 0.19 |
| (T12 + T23)/ΣCT | 0.19 |
| CT2[mm] | 0.22 |
| T23/T12 | 0.14 |
| SR2/CT1 | 0.91 |
| (R1 + R2)/(R1 − R2) | −1.08 |
| R1/f | 0.48 |
| f/f3 | 0.53 |

Embodiment 4

Figure 4A:
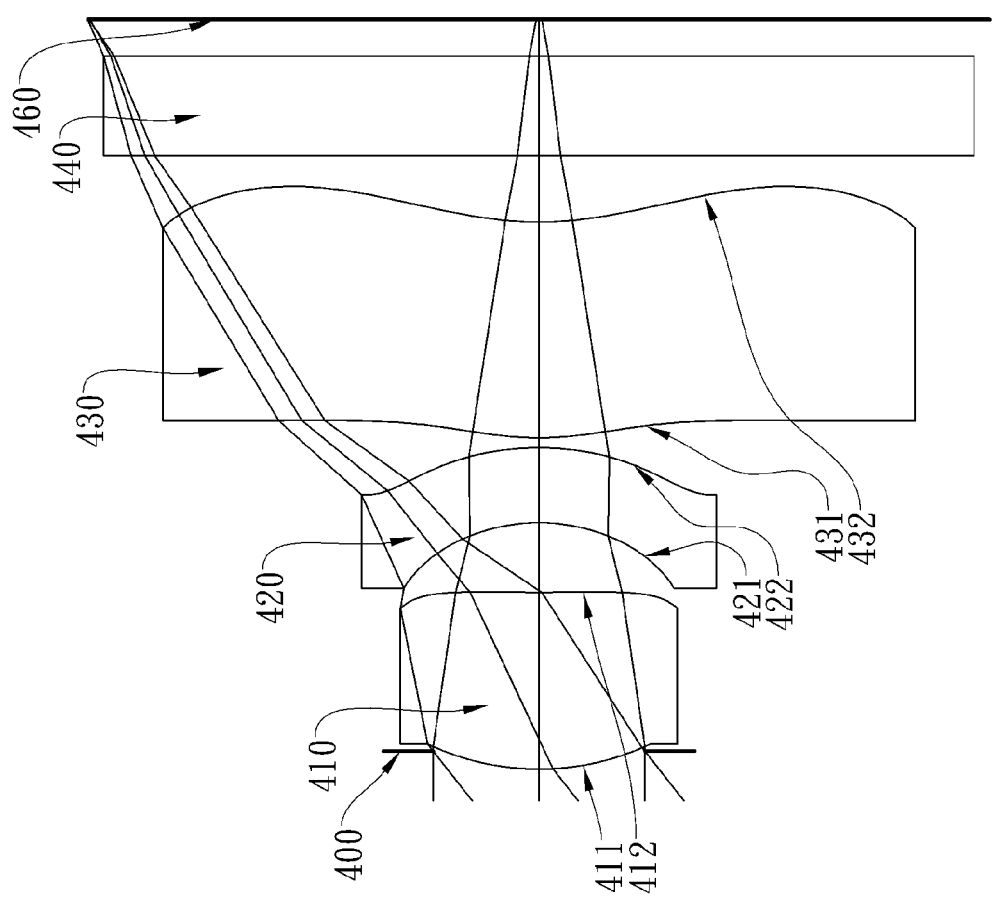
FIG. 4A shows an image capturing lens system in accordance with a fourth embodiment of the present invention.
Figure 4B:
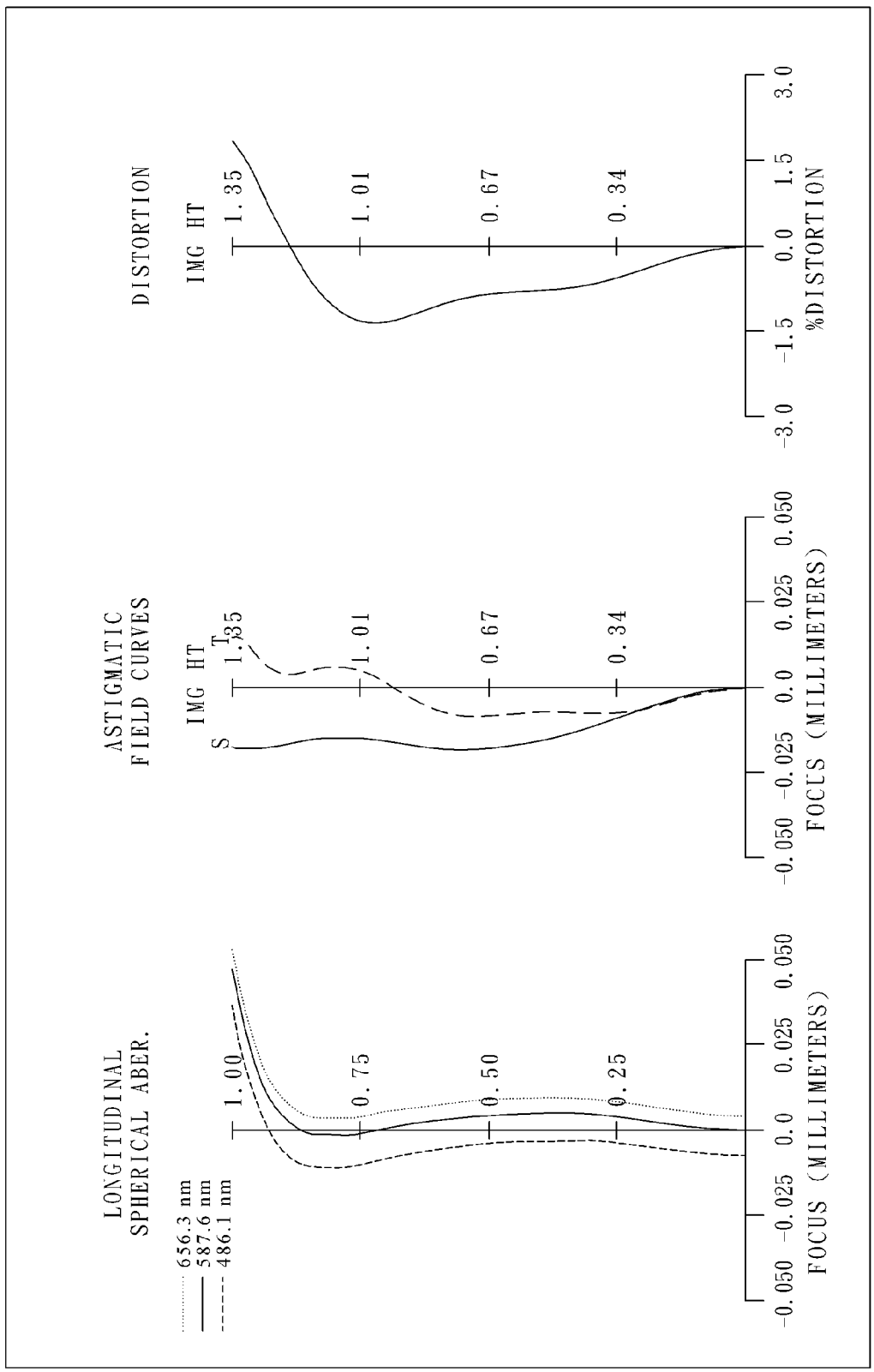
FIG. 4B shows the aberration curves of the fourth embodiment of the present invention.

FIG. 4A shows an image capturing lens system in accordance with the fourth embodiment of the present invention, and FIG. 4B shows the aberration curves of the fourth embodiment of the present invention. The image capturing lens system of the fourth embodiment of the present invention mainly comprises three non-cemented lens elements, in order from an object side to an image side:

TABLE 6

(Embodiment 3)
f = 1.63 mm, Fno = 2.65, HFOV = 38.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.047 | | | | |
| 2 | Lens 1 | 0.786 (ASP) | 0.500 | Plastic | 1.544 | 55.9 | 1.49 |
| 3 | | 19.705 (ASP) | 0.220 | | | | |
| 4 | Lens 2 | −0.484 (ASP) | 0.215 | Plastic | 1.650 | 21.4 | −2.34 |
| 5 | | −0.836 (ASP) | 0.030 | | | | |
| 6 | Lens 3 | 0.729 (ASP) | 0.580 | Plastic | 1.544 | 55.9 | 3.07 |
| 7 | | 0.931 (ASP) | 0.200 | | | | |
| 8 | IR-filter | Plano | 0.400 | Glass | 1.517 | 64.2 | — |
| 9 | | Plano | 0.111 | | | | |
| 10 | Image | Plano | — | | | | |

\* Reference wavelength is d-line 587.6 nm

TABLE 7

Aspheric Coefficients

| | Surface # | | | | | |
|---|---|---|---|---|---|---|
| | 2 | 3 | 4 | 5 | 6 | 7 |
| k = | −1.5820E+01 | 0.0000E+00 | 1.7099E−01 | −9.7153E−01 | −1.3417E+01 | −1.0760E+01 |
| A4 = | 3.5524E+00 | −1.9515E−01 | 4.0298E+00 | −9.0241E−01 | −8.7753E−01 | −1.7288E−01 |
| A6 = | −2.5953E+01 | −1.0519E+01 | −4.5898E+01 | 2.2756E+00 | 1.9230E+00 | −1.1306E−01 |
| A8 = | 1.4442E+02 | 4.7148E+01 | 2.7316E+02 | −1.6320E+01 | −1.8318E+00 | 1.6932E−01 |
| A10 = | −4.0258E+02 | −2.3781E+02 | −5.3500E+02 | 1.9010E+02 | 7.5724E−01 | −8.8989E−02 |
| A12 = | −7.7831E+01 | 1.2230E−06 | −1.1763E+01 | −3.6078E+02 | −2.0408E−01 | 4.9748E−02 |
| A14 = | | | | | 7.3232E−02 | −2.7550E−02 |

The equation of the aspheric surface profiles of the third embodiment has the same form as that of the first embodiment. Moreover, the description of the factors in the relations is as those set forth in the first embodiment, but the values of a plastic first lens element 410 with positive refractive power having a convex object-side surface 411 and a concave image-side surface 412, the object-side and image-side surfaces 411 and 412 thereof being aspheric;

a plastic second lens element 420 with negative refractive power having a concave object-side surface 421 and a convex image-side surface 422, the object-side and image-side surfaces 421 and 422 thereof being aspheric; and a plastic third lens element 430 with positive refractive power having a convex object-side surface 431 and a concave image-side surface 432, the object-side and image-side surfaces 431 and 432 thereof being aspheric; wherein the shape of the image-side surface 432 of the third lens element 430 changes from concave at the paraxial region thereof to convex while away from the paraxial region;

wherein an aperture stop 400 is disposed between an imaged object and the first lens element 410;

the image capturing lens system further comprises a IR cut-filter 440 disposed between the image-side surface 432 of the third lens element 430 and an image plane 460; the IR cut-filter 440 is made of glass and has no influence on the focal length of the image capturing lens system; the image capturing lens system further comprises an image sensor provided on the image plane 460.

The detailed optical data of the fourth embodiment is shown in TABLE 9, and the aspheric surface data is shown in TABLE 10 wherein the units of the curvature radius, the thickness and the focal length are expressed in mm, and HFOV is half of the maximal field of view.

TABLE 9

(Embodiment 4)
f = 1.69 mm, Fno = 2.65, HFOV = 38.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.054 | | | | |
| 2 | Lens 1 | 0.769 (ASP) | 0.532 | Plastic | 1.535 | 56.3 | 1.49 |
| 3 | | 16.463 (ASP) | 0.210 | | | | |
| 4 | Lens 2 | −0.518 (ASP) | 0.225 | Plastic | 1.650 | 21.4 | −2.61 |
| 5 | | −0.873 (ASP) | 0.030 | | | | |
| 6 | Lens 3 | 0.832 (ASP) | 0.650 | Plastic | 1.514 | 56.8 | 4.23 |
| 7 | | 0.991 (ASP) | 0.200 | | | | |
| 8 | IR-filter | Plano | 0.300 | Glass | 1.517 | 64.2 | — |
| 9 | | Plano | 0.109 | | | | |
| 10 | Image | Plano | — | | | | |

* Reference wavelength is d-line 587.6 nm

TABLE 10

Aspheric Coefficients

| | Surface # | | | | | |
|---|---|---|---|---|---|---|
| | 2 | 3 | 4 | 5 | 6 | 7 |
| k = | −1.2644E+01 | 0.0000E+00 | 2.9265E−01 | −1.3775E+00 | −1.3173E+01 | −8.7889E+00 |
| A4 = | 3.2800E+00 | −3.2225E−02 | 3.6492E+00 | −8.5202E−01 | −1.1279E+00 | −1.8505E−01 |
| A6 = | −2.4356E+01 | −1.0955E+01 | −4.5018E+01 | 1.1491E+00 | 2.4319E+00 | −6.1584E−02 |
| A8 = | 1.6153E+02 | 4.8541E+01 | 2.6682E+02 | −1.8153E+01 | −2.0756E+00 | 1.4233E−01 |
| A10 = | −5.3743E+02 | −2.2957E+02 | −5.9379E+02 | 1.9257E+02 | 4.6129E−01 | −2.1635E−01 |
| A12 = | −7.7831E+01 | −9.4498E+01 | −1.1763E+01 | −3.4174E+02 | 1.5181E−02 | 2.1003E−01 |
| A14 = | | | | | 2.4807E−02 | −7.9033E−02 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

| Embodiment 4 | |
|---|---|
| f [mm] | 1.69 |
| Fno | 2.65 |
| HFOV [deg.] | 38.2 |
| V1/V2 | 2.63 |
| ΣAT [mm] | 0.55 |
| ΣAT/TL | 0.24 |
| BAT/f | 0.18 |
| (T12 + T23)/ΣCT | 0.17 |
| CT2[mm] | 0.23 |
| T23/T12 | 0.14 |
| SR2/CT1 | 0.90 |
| (R1 + R2)/(R1 − R2) | −1.10 |
| R1/f | 0.46 |
| f/f3 | 0.40 |

Embodiment 5

Figure 5A:
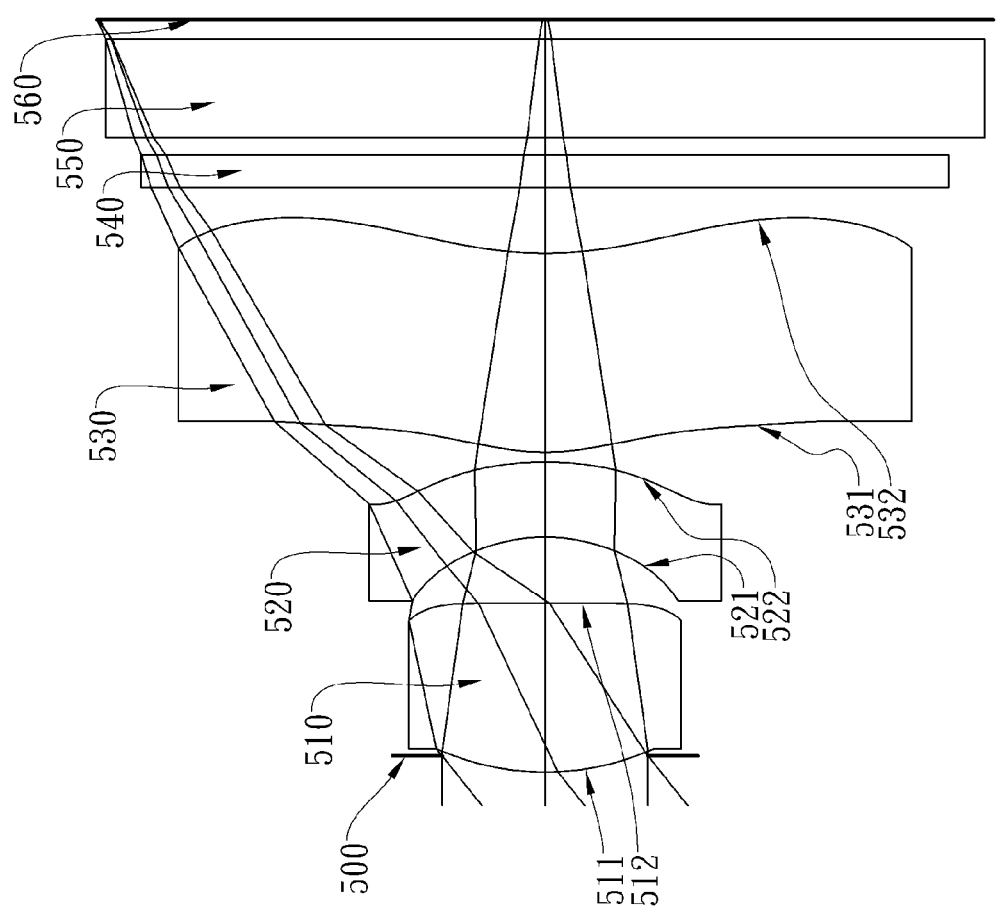
FIG. 5A shows an image capturing lens system in accordance with a fifth embodiment of the present invention.
Figure 5B:
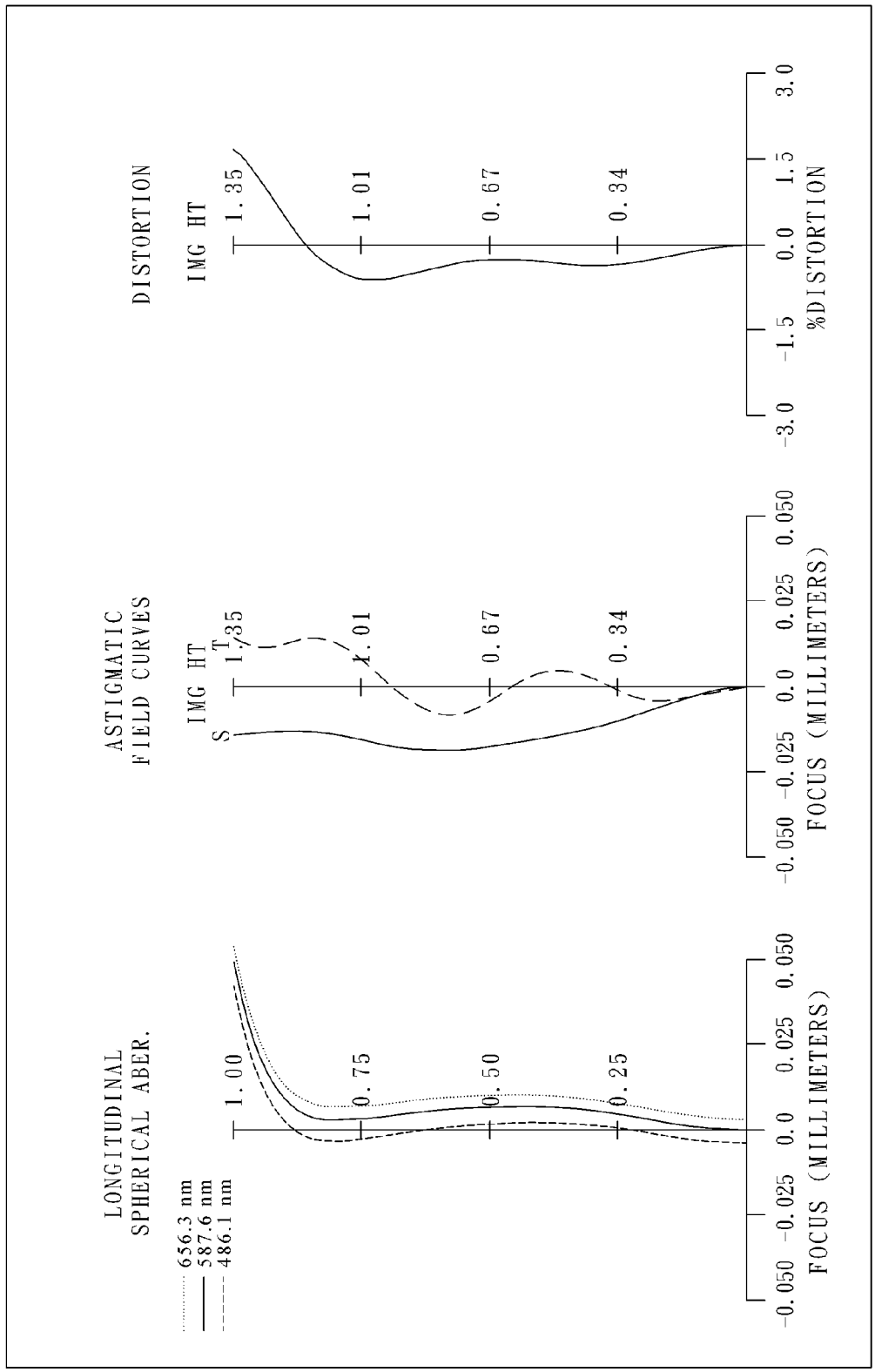
FIG. 5B shows the aberration curves of the fifth embodiment of the present invention.

FIG. 5A shows an image capturing lens system in accordance with the fifth embodiment of the present invention, and FIG. 5B shows the aberration curves of the fifth embodiment of the present invention. The image capturing lens system of the fifth embodiment of the present invention mainly comprises three non-cemented lens elements, in order from an object side to an image side:

a plastic first lens element 510 with positive refractive power having a convex object-side surface 511 and a concave image-side surface 512, the object-side and image-side surfaces 511 and 512 thereof being aspheric;

a plastic second lens element 520 with negative refractive power having a concave object-side surface 521 and a convex image-side surface 522, the object-side and image-side surfaces 521 and 522 thereof being aspheric; and a plastic third lens element 530 with positive refractive power having a convex object-side surface 531 and a concave image-side surface 532, the object-side and image-side surfaces 531 and 532 thereof being aspheric; wherein the shape of the image-side surface 532 of the third lens element 530 changes from concave at the paraxial region thereof to convex while away from the paraxial region;

wherein an aperture stop 500 is disposed between an imaged object and the first lens element 510;

the image capturing lens system further comprises a IR cut-filter 540 disposed between the image-side surface 532 of the third lens element 530 and a cover glass 550; the IR cut-filter 540 is made of glass and has no influence on the focal length of the image capturing lens system; the image capturing lens system further comprises an image sensor provided on an image plane 560.

The detailed optical data of the fifth embodiment is shown in TABLE 12, and the aspheric surface data is shown in TABLE 13, wherein the units of the curvature radius, the thickness and the focal length are expressed in mm, and HFOV is half of the maximal field of view.

TABLE 12

(Embodiment 5)
f = 1.65 mm, Fno = 2.65, HFOV = 38.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.049 | | | | |
| 2 | Lens 1 | 0.781 (ASP) | 0.513 | Plastic | 1.535 | 56.3 | 1.49 |
| 3 | | 28.571 (ASP) | 0.200 | | | | |
| 4 | Lens 2 | −0.512 (ASP) | 0.228 | Plastic | 1.650 | 21.4 | −1.96 |
| 5 | | −1.006 (ASP) | 0.030 | | | | |
| 6 | Lens 3 | 0.693 (ASP) | 0.603 | Plastic | 1.514 | 56.8 | 2.44 |
| 7 | | 1.097 (ASP) | 0.200 | | | | |
| 8 | IR-filter | Plano | 0.100 | Plastic | 1.491 | 52.6 | — |
| 9 | | Plano | 0.050 | | | | |
| 10 | Cover-glass | Plano | 0.300 | Glass | 1.517 | 64.2 | — |
| 11 | | Plano | 0.058 | | | | |
| 12 | Image | Plano | — | | | | |

* Reference wavelength is d-line 587.6 nm

TABLE 13

Aspheric Coefficients

| | Surface # | | | | | |
|---|---|---|---|---|---|---|
| | 2 | 3 | 4 | 5 | 6 | 7 |
| k = | −1.3191E+01 | 0.0000E+00 | 3.1823E−01 | −7.8277E−01 | −8.5201E+00 | −5.3100E+00 |
| A4 = | 3.2427E+00 | −1.0820E−01 | 3.9096E+00 | −9.1593E−01 | −1.1085E+00 | −3.0206E−01 |
| A6 = | −2.4564E+01 | −1.1549E+01 | −4.6221E+01 | 1.3060E+00 | 2.3142E+00 | 7.8369E−02 |
| A8 = | 1.6670E+02 | 4.8120E+01 | 2.6300E+02 | −1.7692E+01 | −2.0664E+00 | 9.7263E−02 |
| A10 = | −5.7870E+02 | −2.3484E+02 | −5.2500E+02 | 1.9200E+02 | 6.6173E−01 | −2.1614E−01 |
| A12 = | −7.7831E+01 | −9.4498E+01 | −1.1763E+01 | −3.4394E+02 | 6.1929E−02 | 1.9655E−01 |
| A14 = | | | | | −8.4345E−02 | −7.0817E−02 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

| Embodiment 5 | |
|---|---|
| f [mm] | 1.65 |
| Fno | 2.65 |
| HFOV [deg.] | 38.7 |
| V1/V2 | 2.63 |
| ΣAT [mm] | 0.54 |
| ΣAT/TL | 0.24 |
| BAT/f | 0.19 |
| (T12 + T23)/ΣCT | 0.17 |
| CT2[mm] | 0.23 |
| T23/T12 | 0.15 |
| SR2/CT1 | 0.90 |
| (R1 + R2)/(R1 − R2) | −1.06 |
| R1/f | 0.47 |
| f/f3 | 0.68 |

Embodiment 6

Figure 6A:
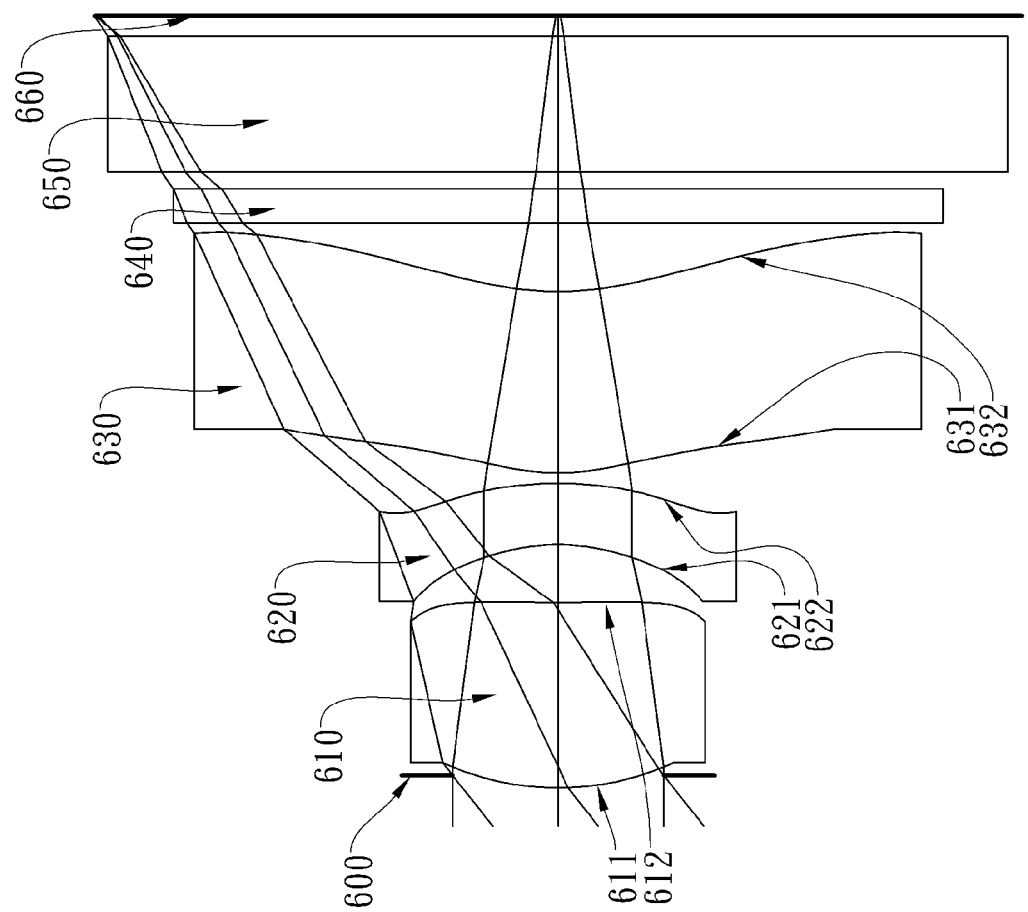
FIG. 6A shows an image capturing lens system in accordance with a sixth embodiment of the present invention.
Figure 6B:
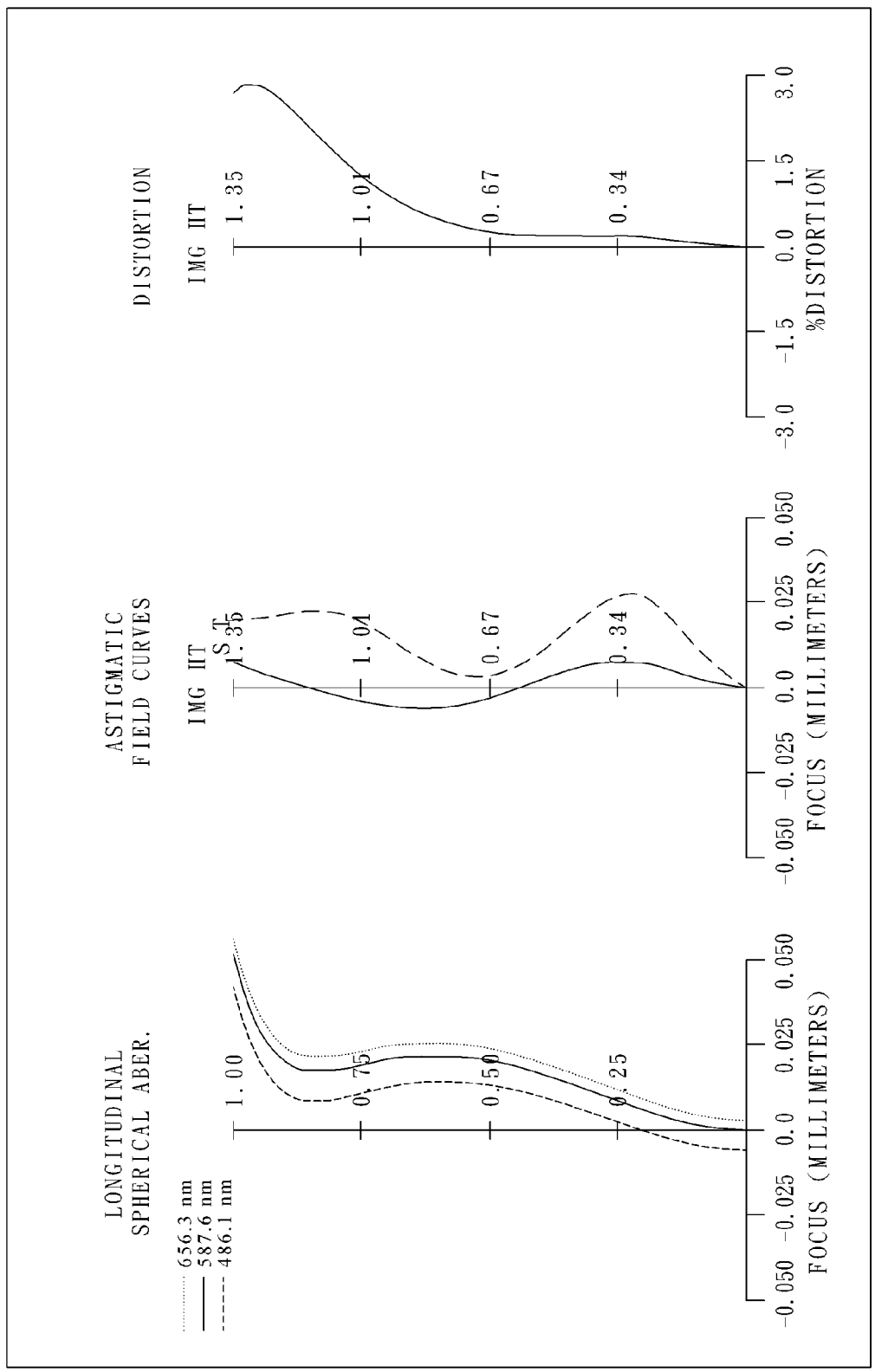
FIG. 6B shows the aberration curves of the sixth embodiment of the present invention.

FIG. 6A shows an image capturing lens system in accordance with the sixth embodiment of the present invention, and FIG. 6B shows the aberration curves of the sixth embodiment of the present invention. The image capturing lens system of the sixth embodiment of the present invention mainly comprises three non-cemented lens elements, in order from an object side to an image side:

a plastic first lens element 610 with positive refractive power having a convex object-side surface 611 and a concave image-side surface 612, the object-side and image-side surfaces 611 and 612 thereof being aspheric;

a plastic second lens element 620 with negative refractive power having a concave object-side surface 621 and a convex image-side surface 622, the object-side and image-side surfaces 621 and 622 thereof being aspheric; and a plastic third lens element 630 with positive refractive power having a convex object-side surface 631 and a concave image-side surface 632, the object-side and image-side surfaces 631 and 632 thereof being aspheric; wherein the shape of the image-side surface 632 of the third lens element 630 changes from concave at the paraxial region thereof to convex while away from the paraxial region;

wherein an aperture stop 600 is disposed between an imaged object and the first lens element 610;

the image capturing lens system further comprises a IR cut-filter 640 disposed between the image-side surface 632 of the third lens element 630 and a cover glass 650; the IR cut-filter 640 is made of glass and has no influence on the focal length of the image capturing lens system; the image capturing lens system further comprises an image sensor provided on an image plane 660.

The detailed optical data of the sixth embodiment is shown in TABLE 15, and the aspheric surface data is shown in TABLE 16, wherein the units of the curvature radius, the thickness and the focal length are expressed in mm, and HFOV is half of the maximal field of view.

ment. Moreover, the description of the factors in the relations is as those set forth in the first embodiment, but the values of the relations of the sixth embodiment are listed in the following TABLE 17.\

TABLE 17

| Embodiment 6 | |
| --- | --- |
| f [mm] | 1.64 |
| Fno | 2.65 |
| HFOV [deg.] | 38.3 |
| V1/V2 | 2.43 |
| ΣAT [mm] | 0.51 |
| ΣAT/TL | 0.23 |
| BAT/f | 0.19 |
| (T12 + T23)/ΣCT | 0.16 |
| CT2[mm] | 0.18 |
| T23/T12 | 0.18 |
| SR2/CT1 | 0.93 |
| (R1 + R2)/(R1 − R2) | −1.11 |
| R1/f | 0.49 |
| f/f3 | 0.73 |

Embodiment 7

Figure 7A:
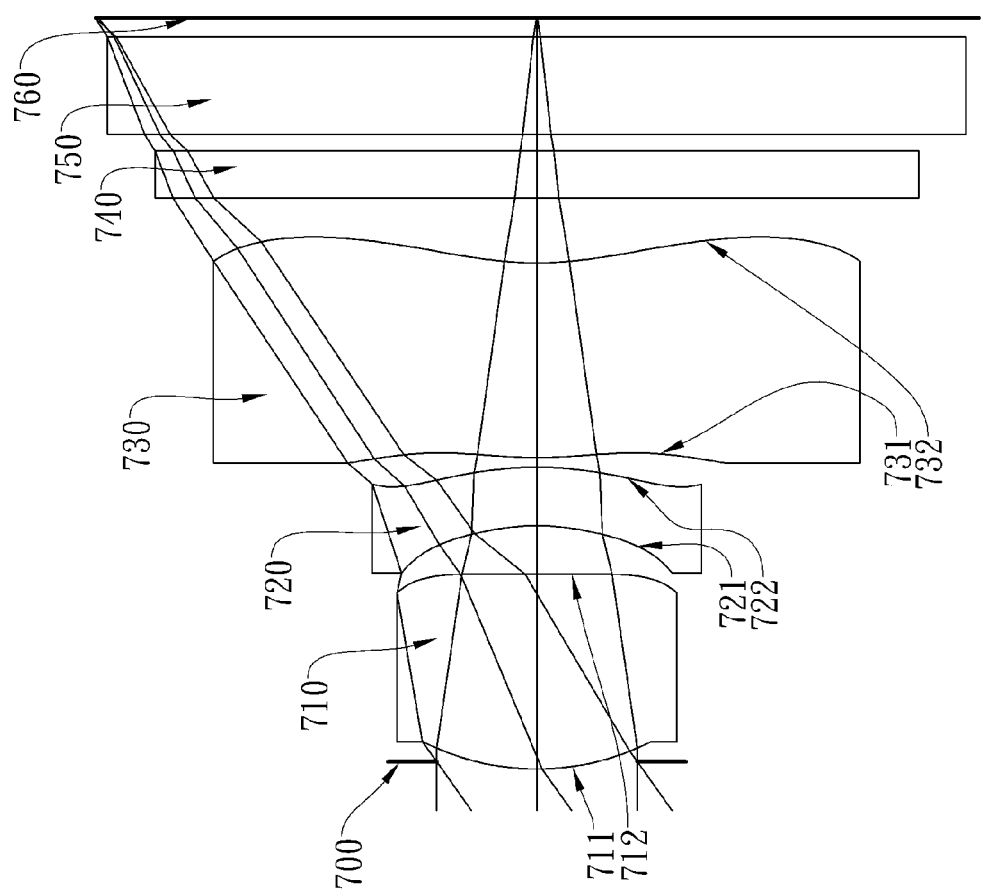
FIG. 7A shows an image capturing lens system in accordance with a seventh embodiment of the present invention.
Figure 7B:
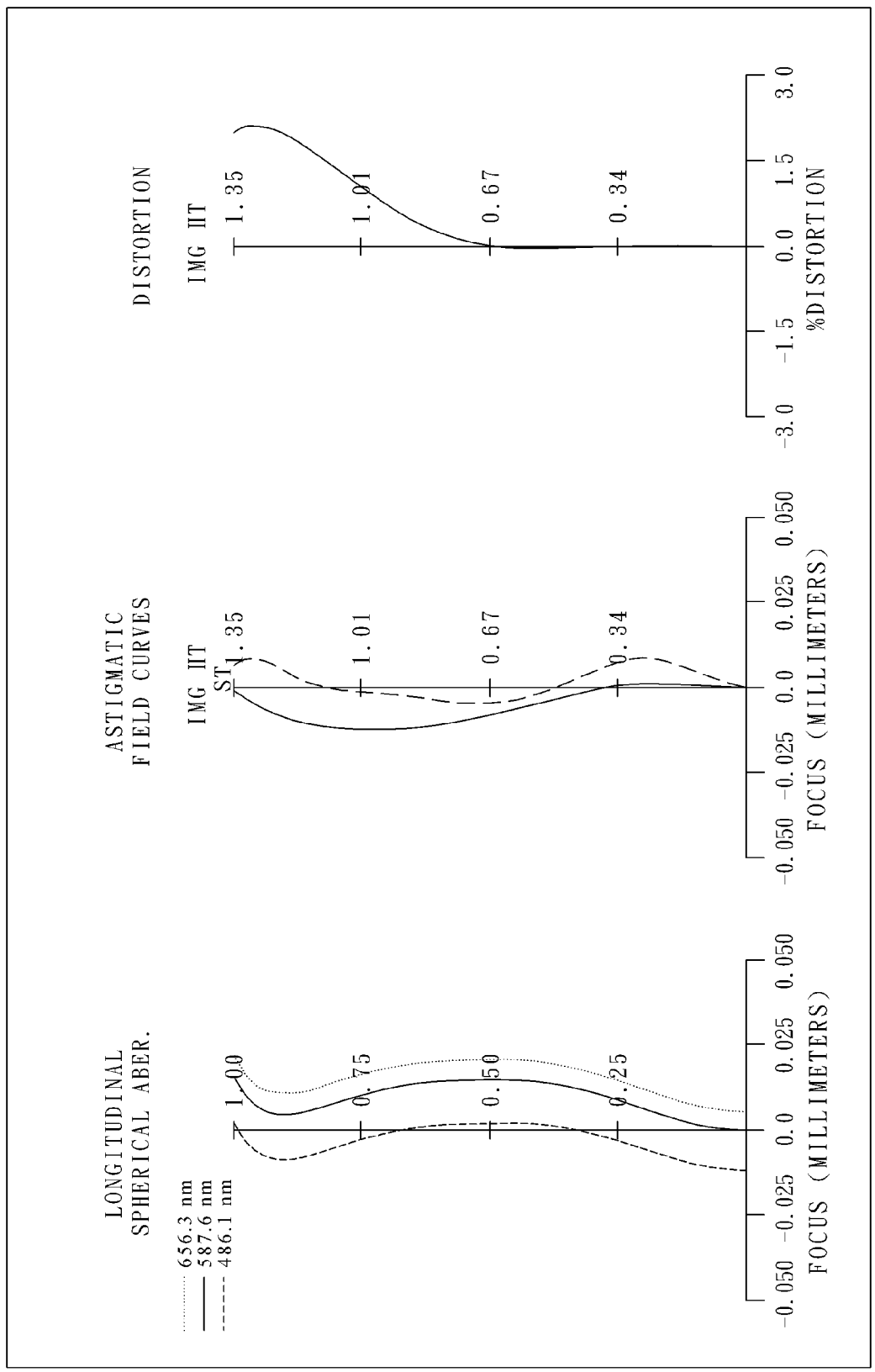
FIG. 7B shows the aberration curves of the seventh embodiment of the present invention.

FIG. 7A shows an image capturing lens system in accordance with the seventh embodiment of the present invention, and FIG. 7B shows the aberration curves of the seventh embodiment of the present invention. The image capturing lens system of the seventh embodiment of the present inven-

TABLE 15

(Embodiment 6)
f = 1.64 mm, Fno = 2.65, HFOV = 38.3 deg.

| Surface # | | Curvature Radius | Thickness | Material | Index | Abbe # | Focal length |
| --- | --- | --- | --- | --- | --- | --- | --- |
| 0 | Object | Plano | Infinity | | | | |
| 1 | Ape. Stop | Plano | −0.037 | | | | |
| 2 | Lens 1 | 0.798 (ASP) | 0.545 | Plastic | 1.514 | 56.8 | 1.62 |
| 3 | | 15.728 (ASP) | 0.170 | | | | |
| 4 | Lens 2 | −0.559 (ASP) | 0.181 | Plastic | 1.633 | 23.4 | −2.07 |
| 5 | | −1.100 (ASP) | 0.030 | | | | |
| 6 | Lens 3 | 0.607 (ASP) | 0.535 | Plastic | 1.514 | 56.8 | 2.25 |
| 7 | | 0.900 (ASP) | 0.200 | | | | |
| 8 | IR-filter | Plano | 0.100 | Plastic | 1.491 | 52.6 | — |
| 9 | | Plano | 0.050 | | | | |
| 10 | Cover-glass | Plano | 0.400 | Glass | 1.517 | 64.2 | — |
| 11 | | Plano | 0.060 | | | | |
| 12 | Image | Plano | — | | | | |

* Reference wavelength is d-line 587.6 nm

TABLE 16

Aspheric Coefficients

| | Surface # | | | | | |
| --- | --- | --- | --- | --- | --- | --- |
| | 2 | 3 | 4 | 5 | 6 | 7 |
| k = | −1.2826E+01 | 0.0000E+00 | 4.2639E−01 | −2.4585E+00 | −9.3206E+00 | −5.5852E+00 |
| A4 = | 3.0011E+00 | 1.2978E−01 | 4.9898E+00 | −7.6669E−01 | −9.1142E−01 | −2.8255E−01 |
| A6 = | −2.3432E+01 | −1.2237E+01 | −4.5047E+01 | 3.1551E+00 | 2.0806E+00 | 1.9539E−01 |
| A8 = | 1.7258E+02 | 5.3713E+01 | 2.3387E+02 | −1.7702E+01 | −2.0438E+00 | 6.9216E−02 |
| A10 = | −7.0543E+02 | −2.5440E+02 | −4.7041E+02 | 1.7629E+02 | 8.1875E−01 | −2.6072E−01 |
| A12 = | 4.8799E+02 | 1.6541E+02 | 1.0946E+02 | −3.4664E+02 | 4.7063E−02 | 2.0213E−01 |
| A14 = | | | | | −1.3014E−01 | −6.0054E−02 |

The equation of the aspheric surface profiles of the sixth embodiment has the same form as that of the first embodiment tion mainly comprises three non-cemented lens elements, in order from an object side to an image side:

a plastic first lens element 710 with positive refractive power having a convex object-side surface 711 and a concave image-side surface 712, the object-side and image-side surfaces 711 and 712 thereof being aspheric;

a plastic second lens element 720 with negative refractive power having a concave object-side surface 721 and a convex image-side surface 722, the object-side and image-side surfaces 721 and 722 thereof being aspheric; and a plastic third lens element 730 with negative refractive power having a convex object-side surface 731 and a concave image-side surface 732, the object-side and image-side surfaces 731 and 732 thereof being aspheric; wherein the shape of the image-side surface 732 of the third lens element 730 changes from concave at the paraxial region thereof to convex while away from the paraxial region;

wherein an aperture stop 700 is disposed between an imaged object and the first lens element 710;

the image capturing lens system further comprises a IR cut-filter 740 disposed between the image-side surface 732 of the third lens element 730 and a cover glass 750; the IR cut-filter 740 is made of glass and has no influence on the focal length of the image capturing lens system; the image capturing lens system further comprises an image sensor provided on an image plane 760.

The detailed optical data of the seventh embodiment is shown in TABLE 18, and the aspheric surface data is shown in TABLE 19, wherein the units of the curvature radius, the thickness and the focal length are expressed in mm, and HFOV is half of the maximal field of view.

ment. Moreover, the description of the factors in the relations is as those set forth in the first embodiment, but the values of the relations of the seventh embodiment are listed in the following TABLE 20.

TABLE 20

| Embodiment 7 | |
| --- | --- |
| f [mm] | 1.85 |
| Fno | 3.00 |
| HFOV [deg.] | 35.4 |
| V1/V2 | 2.38 |
| ΣAT [mm] | 0.49 |
| ΣAT/TL | 0.21 |
| BAT/f | 0.17 |
| (T12 + T23)/ΣCT | 0.13 |
| CT2[mm] | 0.18 |
| T23/T12 | 0.20 |
| SR2/CT1 | 0.96 |
| (R1 + R2)/(R1 − R2) | −1.05 |
| R1/f | 0.41 |
| f/f3 | −0.05 |

Embodiment 8

Figure 8A:
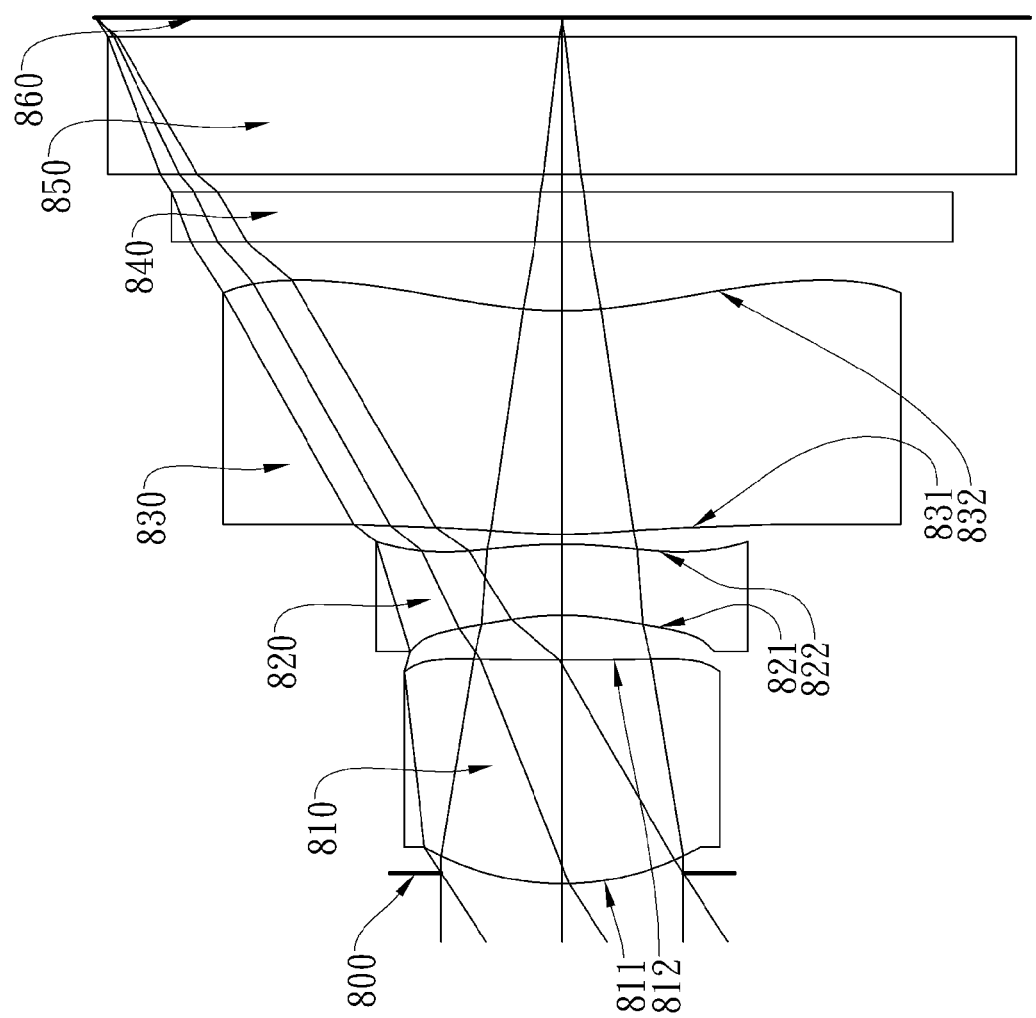
FIG. 8A shows an image capturing lens system in accordance with an eighth embodiment of the present invention.
Figure 8B:
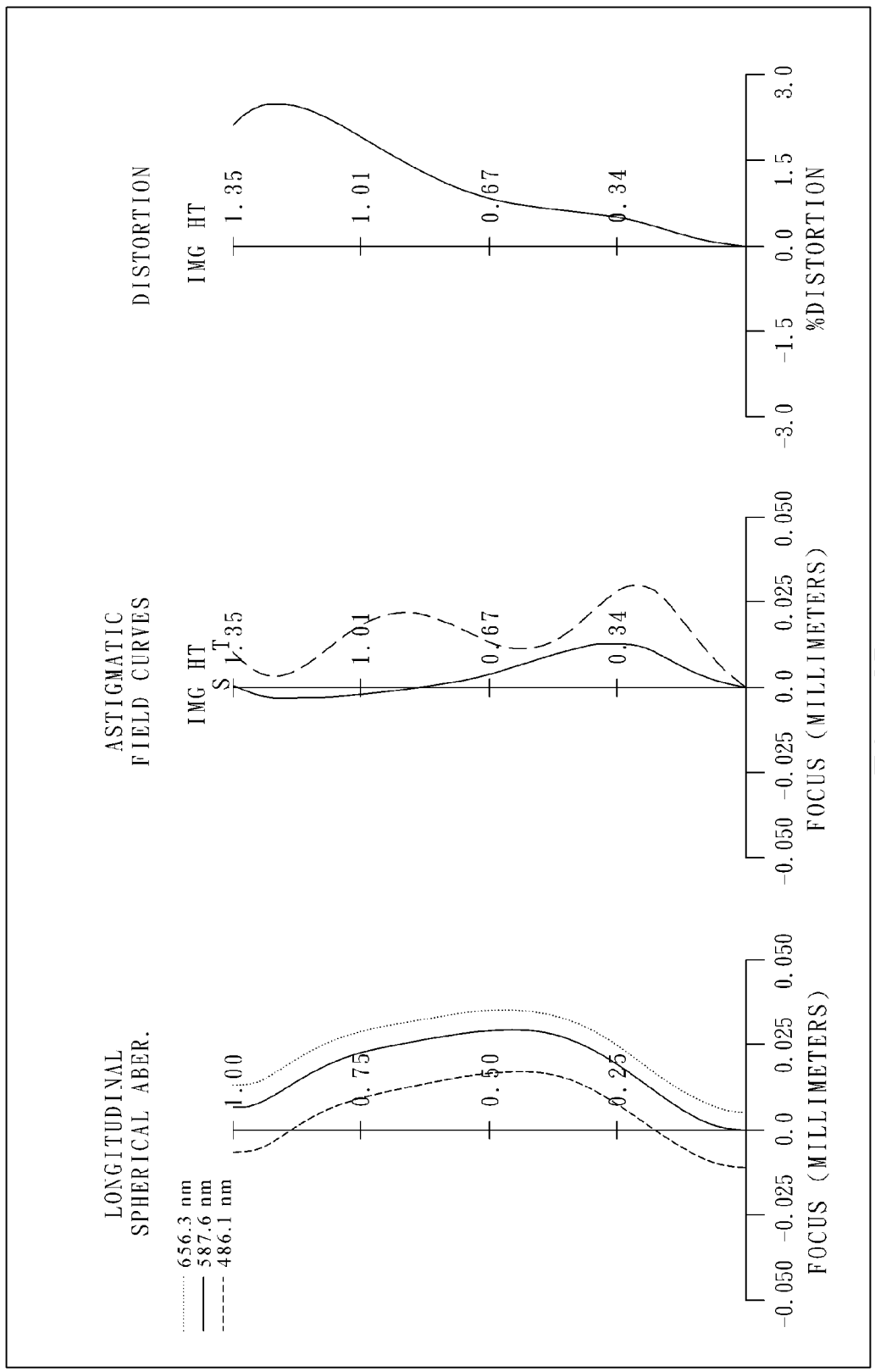
FIG. 8B shows the aberration curves of the eighth embodiment of the present invention.

FIG. 8A shows an image capturing lens system in accordance with the eighth embodiment of the present invention, and FIG. 8B shows the aberration curves of the eighth embodiment of the present invention. The image capturing lens system of the eighth embodiment of the present invention

TABLE 18

(Embodiment 7)
f = 1.85 mm, Fno = 3.00, HFOV = 35.4 deg.

| Surface # | | Curvature Radius | Thickness | Material | Index | Abbe # | Focal length |
| --- | --- | --- | --- | --- | --- | --- | --- |
| 0 | Object | Plano | Infinity | | | | |
| 1 | Ape. Stop | Plano | −0.023 | | | | |
| 2 | Lens 1 | 0.754 (ASP) | 0.600 | Plastic | 1.530 | 55.8 | 1.45 |
| 3 | | 28.571 (ASP) | 0.150 | | | | |
| 4 | Lens 2 | −0.669 (ASP) | 0.180 | Plastic | 1.633 | 23.4 | −3.38 |
| 5 | | −1.076 (ASP) | 0.030 | | | | |
| 6 | Lens 3 | 1.308 (ASP) | 0.600 | Plastic | 1.544 | 55.9 | −36.73 |
| 7 | | 1.029 (ASP) | 0.200 | | | | |
| 8 | IR-filter | Plano | 0.145 | Glass | 1.517 | 64.2 | — |
| 9 | | Plano | 0.050 | | | | |
| 10 | Cover-glass | Plano | 0.300 | Glass | 1.517 | 64.2 | — |
| 11 | | Plano | 0.059 | | | | |
| 12 | Image | Plano | — | | | | |

* Reference wavelength is d-line 587.6 nm

TABLE 19

Aspheric Coefficients

| | Surface # | | | | | |
| --- | --- | --- | --- | --- | --- | --- |
| | 2 | 3 | 4 | 5 | 6 | 7 |
| k = | −1.2609E+01 | 0.0000E+00 | 1.8291E−01 | −9.5849E+00 | −4.0148E+01 | −1.0257E+01 |
| A4 = | 3.3977E+00 | 2.9918E−01 | 4.0789E+00 | −2.3312E−01 | −1.6238E+00 | −4.4915E−01 |
| A6 = | −2.4662E+01 | −1.3755E+01 | −3.9511E+01 | 2.0008E+00 | 3.2805E+00 | 5.7265E−01 |
| A8 = | 1.5043E+02 | 5.3979E+01 | 1.9206E+02 | −1.8627E+01 | −1.6186E+00 | −4.6990E−01 |
| A10 = | −4.4466E+02 | −3.1441E+02 | −7.0922E+02 | 1.7973E+02 | −1.0272E−01 | 2.6699E−03 |
| A12 = | −7.8028E+01 | 5.5494E+02 | 8.8324E+02 | −3.5535E+02 | −4.5240E−01 | 2.4833E−01 |
| A14 = | | | | | −1.9890E+00 | −1.3839E−01 |

The equation of the aspheric surface profiles of the seventh embodiment has the same form as that of the first embodiment.

mainly comprises three non-cemented lens elements, in order from an object side to an image side:

a plastic first lens element 810 with positive refractive power having a convex object-side surface 811 and a concave image-side surface 812, the object-side and image-side surfaces 811 and 812 thereof being aspheric;

a plastic second lens element 820 with negative refractive power having a concave object-side surface 821 and a convex image-side surface 822, the object-side and image-side surfaces 821 and 822 thereof being aspheric; and a plastic third lens element 830 with negative refractive power having a convex object-side surface 831 and a concave image-side surface 832, the object-side and image-side surfaces 831 and 832 thereof being aspheric; wherein the shape of the image-side surface 832 of the third lens element 830 changes from concave at the paraxial region thereof to convex while away from the paraxial region;

wherein an aperture stop 800 is disposed between an imaged object and the first lens element 810;

the image capturing lens system further comprises a IR cut-filter 840 disposed between the image-side surface 832 of the third lens element 830 and a cover glass 850; the IR cut-filter 840 is made of glass and has no influence on the focal length of the image capturing lens system; the image capturing lens system further comprises an image sensor provided on an image plane 860.

The detailed optical data of the eighth embodiment is shown in TABLE 21, and the aspheric surface data is shown in TABLE 22, wherein the units of the curvature radius, the thickness and the focal length are expressed in mm, and HFOV is half of the maximal field of view.

ment. Moreover, the description of the factors in the relations is as those set forth in the first embodiment, but the values of the relations of the eighth embodiment are listed in the following TABLE 23.

TABLE 23

| Embodiment 8 | |
| --- | --- |
| f [mm] | 2.00 |
| Fno | 2.85 |
| HFOV [deg.] | 33.1 |
| V1/V2 | 2.38 |
| ΣAT [mm] | 0.47 |
| ΣAT/TL | 0.19 |
| BAT/f | 0.15 |
| (T12 + T23)/ΣCT | 0.11 |
| CT2[mm] | 0.21 |
| T23/T12 | 0.23 |
| SR2/CT1 | 0.95 |
| (R1 + R2)/(R1 − R2) | −1.03 |
| R1/f | 0.40 |
| f/f3 | −0.05 |

Embodiment 9

Figure 9A:
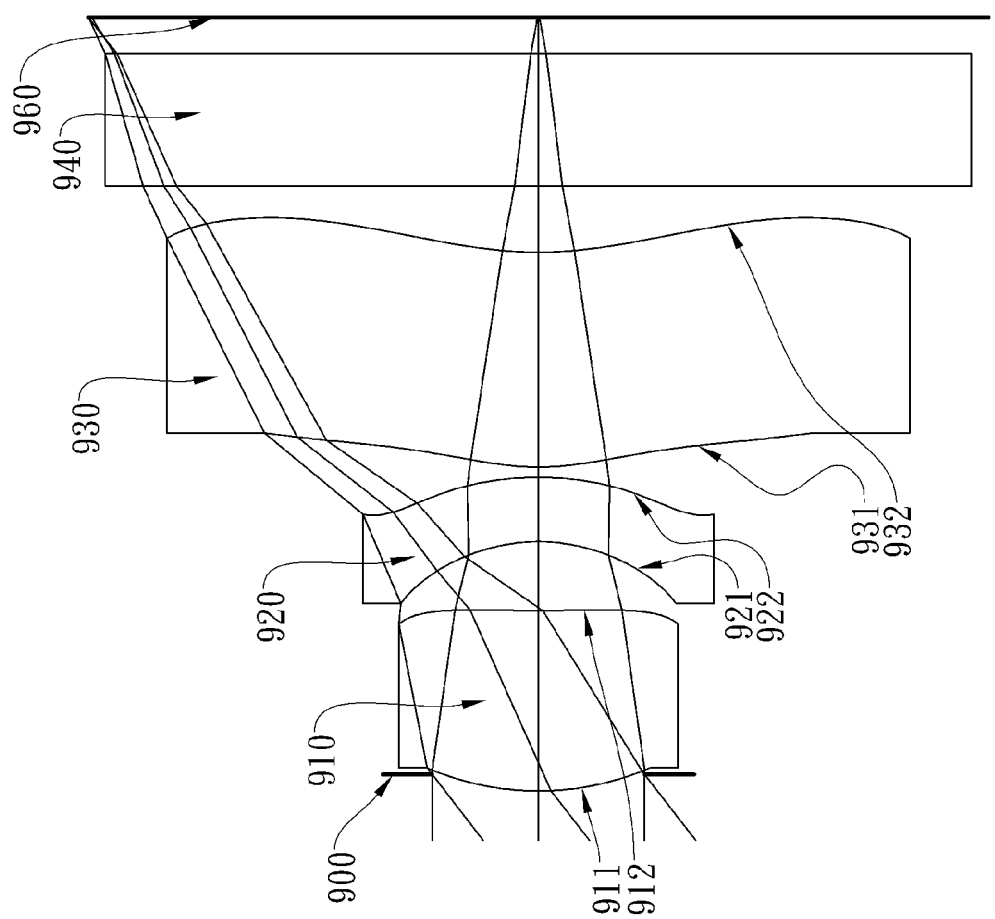
FIG. 9A shows an image capturing lens system in accordance with a ninth embodiment of the present invention.
Figure 9B:
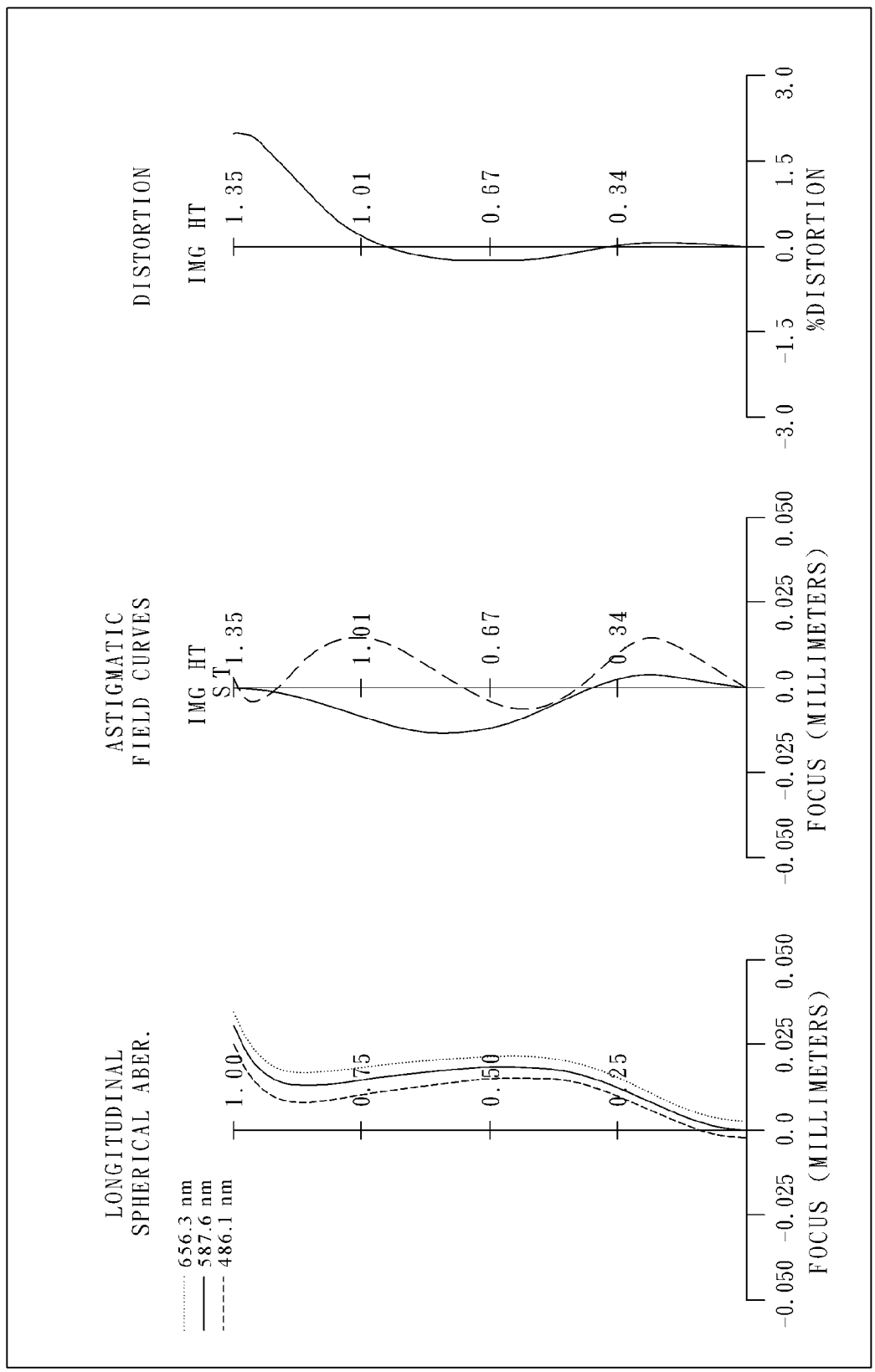
FIG. 9B shows the aberration curves of the ninth embodiment of the present invention.

FIG. 9A shows an image capturing lens system in accordance with the ninth embodiment of the present invention, and FIG. 9B shows the aberration curves of the ninth embodiment of the present invention. The image capturing lens system of the ninth embodiment of the present invention mainly comprises three non-cemented lens elements, in order from an object side to an image side:

TABLE 21

(Embodiment 8)
f = 2.00 mm, Fno = 2.85, HFOV = 33.1 deg.

| Surface # | | Curvature Radius | Thickness | Material | Index | Abbe # | Focal length |
| --- | --- | --- | --- | --- | --- | --- | --- |
| 0 | Object | Plano | Infinity | | | | |
| 1 | Ape. Stop | Plano | −0.031 | | | | |
| 2 | Lens 1 | 0.792 (ASP) | 0.650 | Plastic | 1.530 | 55.8 | 1.51 |
| 3 | | 57.077 (ASP) | 0.130 | | | | |
| 4 | Lens 2 | −0.794 (ASP) | 0.206 | Plastic | 1.633 | 23.4 | −3.24 |
| 5 | | −1.429 (ASP) | 0.030 | | | | |
| 6 | Lens 3 | 1.482 (ASP) | 0.650 | Plastic | 1.544 | 55.9 | −39.72 |
| 7 | | 1.172 (ASP) | 0.200 | | | | |
| 8 | IR-filter | Plano | 0.145 | Glass | 1.517 | 64.2 | — |
| 9 | | Plano | 0.050 | | | | |
| 10 | Cover-glass | Plano | 0.400 | Glass | 1.517 | 64.2 | — |
| 11 | | Plano | 0.057 | | | | |
| 12 | Image | Plano | — | | | | |

* Reference wavelength is d-line 587.6 nm

TABLE 22

Aspheric Coefficients

| | Surface # | | | | | |
| --- | --- | --- | --- | --- | --- | --- |
| | 2 | 3 | 4 | 5 | 6 | 7 |
| k = | −1.3054E+01 | 5.0000E+01 | −2.9843E−01 | 8.3553E−01 | −7.6482E+01 | −1.1844E+01 |
| A4 = | 2.9823E+00 | 9.5165E−01 | 3.9730E+00 | 9.5886E−01 | −6.8174E−01 | −2.6805E−01 |
| A6 = | −1.7791E+01 | −1.2035E+01 | −2.4227E+01 | 8.4915E+00 | 2.4067E+00 | 2.6534E−01 |
| A8 = | 7.9989E+01 | 8.7453E+01 | 1.2119E+02 | −4.2504E+01 | −3.4505E+00 | −1.7624E−01 |
| A10 = | −1.4659E+02 | −5.0239E+02 | −4.5802E+02 | 7.4247E+01 | 4.2085E−01 | −6.4001E−02 |
| A12 = | −7.8028E+01 | 8.0294E+02 | 1.5060E+02 | −3.7314E+01 | 4.8911E+00 | 1.3671E−01 |
| A14 = | | | | | −3.9323E+00 | −6.3735E−02 |

The equation of the aspheric surface profiles of the eighth embodiment has the same form as that of the first embodiment.

a glass first lens element 910 with positive refractive power having a convex object-side surface 911 and a concave image-side surface 912, the object-side and image-side surfaces 911 and 912 thereof being aspheric;

a plastic second lens element 920 with negative refractive power having a concave object-side surface 921 and a convex image-side surface 922, the object-side and image-side surfaces 921 and 922 thereof being aspheric; and a plastic third lens element 930 with positive refractive power having a convex object-side surface 931 and a concave image-side surface 932, the object-side and image-side surfaces 931 and 932 thereof being aspheric; wherein the shape of the image-side surface 932 of the third lens element 930 changes from concave at the paraxial region thereof to convex while away from the paraxial region;

wherein an aperture stop 900 is disposed between an imaged object and the first lens element 910;

the image capturing lens system further comprises a IR cut-filter 940 disposed between the image-side surface 932 of the third lens element 930 and an image plane 960; the IR cut-filter 940 is made of glass and has no influence on the focal length of the image capturing lens system; the image capturing lens system further comprises an image sensor provided on the image plane 960.

The detailed optical data of the ninth embodiment is shown in TABLE 24, and the aspheric surface data is shown in TABLE 25 wherein the units of the curvature radius, the thickness and the focal length are expressed in mm, and HFOV is half of the maximal field of view.

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26.

TABLE 26

| Embodiment 9 | |
|---|---|
| f [mm] | 1.70 |
| Fno | 2.65 |
| HFOV [deg.] | 37.7 |
| V1/V2 | 2.86 |
| ΣAT [mm] | 0.55 |
| ΣAT/TL | 0.24 |
| BAT/f | 0.18 |
| (T12 + T23)/ΣCT | 0.17 |
| CT2[mm] | 0.19 |
| T23/T12 | 0.15 |
| SR2/CT1 | 0.91 |
| (R1 + R2)/(R1 − R2) | −1.17 |
| R1/f | 0.49 |
| f/f3 | 0.72 |

It is to be noted that TABLES 1-26 show different data of the different embodiments, however, the data of the different embodiments are obtained from experiments. Therefore, any image capturing lens system of the same structure is considered to be within the scope of the present invention even if it uses different data. The embodiments depicted above and the

TABLE 24

(Embodiment 9)
f = 1.70 mm, Fno = 2.65, HFOV = 37.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.050 | | | | |
| 2 | Lens 1 | 0.829 (ASP) | 0.545 | Glass | 1.566 | 61.1 | 1.56 |
| 3 | | 10.414 (ASP) | 0.209 | | | | |
| 4 | Lens 2 | −0.505 (ASP) | 0.194 | Plastic | 1.650 | 21.4 | −1.94 |
| 5 | | −0.969 (ASP) | 0.031 | | | | |
| 6 | Lens 3 | 0.727 (ASP) | 0.650 | Plastic | 1.535 | 56.3 | 2.37 |
| 7 | | 1.178 (ASP) | 0.200 | | | | |
| 8 | IR-filter | Plano | 0.400 | Glass | 1.517 | 64.2 | — |
| 9 | | Plano | 0.110 | | | | |
| 10 | Image | Plano | — | | | | |

\* Reference wavelength is d-line 587.6 nm

TABLE 25

| Aspheric Coefficients | | | | | | |
|---|---|---|---|---|---|---|
| | Surface # | | | | | |
| | 2 | 3 | 4 | 5 | 6 | 7 |
| k = | −1.7100E+01 | 4.9905E+01 | 2.3212E−01 | −1.1613E+00 | −1.3218E+01 | −9.8653E+00 |
| A4 = | 3.3994E+00 | −6.3279E−02 | 4.4062E+00 | −8.6566E−01 | −8.1137E−01 | −1.6117E−01 |
| A6 = | −2.6219E+01 | −1.0536E+01 | −4.6413E+01 | 2.3949E+00 | 1.8603E+00 | −4.7934E−02 |
| A8 = | 1.5425E+02 | 4.9609E+01 | 2.6646E+02 | −1.6438E+01 | −1.8615E+00 | 1.6478E−01 |
| A10 = | −4.2165E+02 | −2.0405E+02 | −4.7599E+02 | 1.8768E+02 | 8.3574E−01 | −1.6064E−01 |
| A12 = | −7.7831E+01 | 1.0857E−05 | −1.1763E+01 | −3.6471E+02 | −1.3642E−01 | 9.1503E−02 |
| A14 = | | | | | −1.1269E−02 | −2.8623E−02 |

What is claimed is:

1. An image capturing lens system, in order from an object side to an image side comprising three non-cemented lens elements with refractive power:
   a first lens element with positive refractive power having a convex object-side surface, and both the object-side and image-side surfaces being aspheric;
   a plastic second lens element with negative refractive power having a concave object-side surface and a convex image-side surface, and both the object-side and image-side surfaces being aspheric; and
   a plastic third lens element with refractive power having a convex object-side surface and a concave image-side surface, and both the object-side and image-side surfaces being aspheric; wherein the shape of the image-side surface of the third lens element changes from concave at the paraxial region thereof to convex while away from the paraxial region;
   wherein the image capturing lens system comprises a stop positioned between an imaged object and the image-side surface of the first lens element;
   wherein a total axial distance of the air intervals between the object-side surface of the first lens element and an image plane is ΣAT, an axial distance between the object-side surface of the first lens element and the image plane is TL, an axial distance between the stop and the image-side surface of the first lens element is SR2, a central thickness of the first lens element is CT1, and they satisfy the following relations:

$0.10\ mm < \Sigma AT < 0.65\ mm;$ $0.10 < \Sigma AT/TL < 0.35;$ and $0.65 < SR2/CT1 < 1.50.$ 2. The image capturing lens system according to claim 1, wherein the total axial distance of the air intervals between the object-side surface of the first lens element and the image plane is ΣAT, and it satisfies the following relation:

$0.10\ mm < \Sigma AT < 0.55\ mm.$

3. The image capturing lens system according to claim 1, wherein an axial distance between the second lens element and the third lens element is T23, an axial distance between the first lens element and the second lens element is T12, and they satisfy the following relation:

$0 < T23/T12 < 0.35.$

4. The image capturing lens system according to claim 3, wherein a total axial distance of the air intervals between the image-side surface of the third lens element and the image plane is BAT, a focal length of the image capturing lens system is f, and they satisfy the following relation:

$0.1 < BAT/f < 0.24.$

5. The image capturing lens system according to claim 1, wherein the first lens element has a concave image-side surface.

6. The image capturing lens system according to claim 5, wherein an axial distance between the first lens element and the second lens element is T12, an axial distance between the second lens element and the third lens element is T23, a total central thickness of all lens elements in the image capturing lens system is ΣCT, and they satisfy the following relation:

$0.1 < (T12+T23)/\Sigma CT < 0.35.$

7. The image capturing lens system according to claim 1, wherein a focal length of the image capturing lens system is f, a focal length of the third lens element is f3, and they satisfy the following relation:

$-0.2 < f/f3 < 0.$

8. The image capturing lens system according to claim 1, wherein a focal length of the image capturing lens system is f, and it satisfies the following relation:

$1.20\ mm < f < 2.20\ mm.$

9. The image capturing lens system according to claim 8, wherein a curvature radius of the object-side surface of the first lens element is R1, the focal length of the image capturing lens system is f, and they satisfy the following relation:

$0.35 < R1/f < 0.55.$

10. The image capturing lens system according to claim 8, wherein an Abbe number of the first lens element is V1, an Abbe number of the second lens element is V2, and they satisfy the following relation:

$2.0 < V1/V2 < 3.5.$

11. The image capturing lens system according to claim 8, wherein a central thickness of the second lens element is CT2, and it satisfies the following relation:

$0.15\ mm < CT2 < 0.24\ mm.$

12. The image capturing lens system according to claim 1, further comprising at least two flat elements positioned between the image-side surface of the third lens element and the image plane.

13. An image capturing lens system, in order from an object side to an image side comprising three non-cemented lens elements with refractive power:
    a first lens element with positive refractive power having a convex object-side surface, and both the object-side and image-side surfaces being aspheric;
    a plastic second lens element with negative refractive power having a concave object-side surface and a convex image-side surface, and both the object-side and image-side surfaces being aspheric; and
    a plastic third lens element with refractive power having a convex object-side surface and a concave image-side surface, and both the object-side and image-side surfaces being aspheric; wherein the shape of the image-side surface of the third lens element changes from concave at the paraxial region thereof to convex while away from the paraxial region;
    wherein a total axial distance of the air intervals between the object-side surface of the first lens element and an image plane is ΣAT, a curvature radius of the object-side surface of the first lens element is R1, a curvature radius of the image-side surface of the first lens element is R2, an axial distance between the second lens element and the third lens element is T23, an axial distance between the first lens element and the second lens element is T12, an axial distance between the object-side surface of the first lens element and the image plane is TL, and they satisfy the following relations:

$0.10\ mm < \Sigma AT < 0.65\ mm;$ $-1.40 < (R1+R2)/(R1-R2) < -0.75;$ $0 < T23/T12 < 0.35;$ and $0.10 < \Sigma AT/TL < 0.35.$

14. The image capturing lens system according to claim 13, wherein the total axial distance of the air intervals between the object-side surface of the first lens element and the image plane is ΣAT, and it satisfies the following relation:

$$0.10 \text{ mm} < \Sigma AT < 0.55 \text{ mm}.$$

15. The image capturing lens system according to claim 13, wherein a total axial distance of the air intervals between the image-side surface of the third lens element and the image plane is BAT, a focal length of the image capturing lens system is f, and they satisfy the following relation:

$$0.1 < BAT/f < 0.24.$$

16. The image capturing lens system according to claim 13, wherein the first lens element has a concave image-side surface.

17. The image capturing lens system according to claim 13, wherein a focal length of the image capturing lens system is f, a focal length of the third lens element is f3, and they satisfy the following relation:

$$-0.2 < f/f3 < 0.$$

18. The image capturing lens system according to claim 13, wherein an Abbe number of the first lens element is V1, an Abbe number of the second lens element is V2, and they satisfy the following relation:

$$2.0 < V1/V2 < 3.5.$$

19. The image capturing lens system according to claim 13, wherein a focal length of the image capturing lens system is f, and it satisfies the following relation:

$$1.20 \text{ mm} < f < 2.20 \text{ mm}.$$

20. The image capturing lens system according to claim 19, further comprising a stop; wherein an axial distance between the stop and the image-side surface of the first lens element is SR2, a central thickness of the first lens element is CT1, and they satisfy the following relation:

$$0.65 < SR2/CT1 < 1.50.$$

21. The image capturing lens system according to claim 19, wherein the axial distance between the first lens element and the second lens element is T12, the axial distance between the second lens element and the third lens element is T23, a total central thickness of all lens elements in the image capturing lens system is ΣCT, and they satisfy the following relation:

$$0.1 < (T12+T23)/\Sigma CT < 0.35.$$

22. The image capturing lens system according to claim 13, wherein a central thickness of the second lens element is CT2, and it satisfies the following relation:

$$0.15 \text{ mm} < CT2 < 0.24 \text{ mm}.$$

23. The image capturing lens system according to claim 13, further comprising at least two flat elements positioned between the image-side surface of the third lens element and the image plane.

* * * * *